US012746544B2

(12) United States Patent
Chou et al.

(10) Patent No.: US 12,746,544 B2
(45) Date of Patent: Sep. 29, 2026

(54) PEDESTAL CARD AND METHODS FOR LIQUID SAMPLE CONTROL AND ASSAY

(71) Applicant: Essenlix Corporation, Monmouth Junction, NJ (US)

(72) Inventors: Stephen Y. Chou, Princeton, NJ (US); Wei Ding, Princeton, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 563 days.

(21) Appl. No.: 18/265,494

(22) PCT Filed: Dec. 7, 2021

(86) PCT No.: PCT/US2021/062282

§ 371 (c)(1),
(2) Date: Jun. 6, 2023

(87) PCT Pub. No.: WO2022/125594

PCT Pub. Date: Jun. 16, 2022

(65) Prior Publication Data

US 2024/0042428 A1 Feb. 8, 2024

Related U.S. Application Data

(60) Provisional application No. 63/122,458, filed on Dec. 7, 2020.

(51) Int. Cl.

*B01L 3/00* (2006.01)
*G01N 1/28* (2006.01)

(Continued)

(52) U.S. Cl.

CPC ........... *B01L 3/5027* (2013.01); *B01L 3/5088* (2013.01); *B01L 3/527* (2013.01); *G01N 1/2813* (2013.01);

(Continued)

(58) Field of Classification Search

None

See application file for complete search history.

(56) References Cited

U.S. PATENT DOCUMENTS

2004/0028558 A1* 2/2004 Pollock ............ A61B 5/150358 435/287.9
2015/0098873 A1 4/2015 Ku (Continued)

FOREIGN PATENT DOCUMENTS

WO 2017027643 A1 2/2017
WO 2018148607 A1 8/2018

(Continued)

OTHER PUBLICATIONS

International Search Report and Written Opinion of the International Searching Authority established by the ISA/AU completed on Feb. 21, 2022, for PCT/US2021/062282.

*Primary Examiner* — Lore R Jarrett

(57) ABSTRACT

A device for liquid sample collection and liquid sample analysis, including: a base plate having: at least one pedestal area in at least a portion of a sample image area; and at least one recessed area, wherein at least of a portion of the at least one pedestal area is adjacent to the at least one recessed area; a cover plate that opposes the base plate; a plurality of spacers attached to one of the base plate, the cover plate, or both, and the spacers are situated between the opposable plates; and an exterior liquid sample contact area on an exterior location of the device; wherein the base plate and the cover plate define an interior cavity in fluid communication with the exterior liquid sample contact area. Also disclosed are an apparatus including the device, a method of making the device, and a method of using the device.

33 Claims, 11 Drawing Sheets

(51) Int. Cl.
*G01N 21/25* (2006.01)
*G01N 21/64* (2006.01)

(52) U.S. Cl.
CPC ....... *G01N 21/251* (2013.01); *G01N 21/6486* (2013.01); *B01L 2300/0816* (2013.01); *B01L 2300/0864* (2013.01); *B01L 2400/0406* (2013.01); *B01L 2400/086* (2013.01)

(56) References Cited

U.S. PATENT DOCUMENTS

2019/0376888 A1 12/2019 Chou et al.
2020/0103401 A1* 4/2020 Chou ................... G01N 33/492
2020/0363408 A1* 11/2020 Chou ............... G01N 33/54313

FOREIGN PATENT DOCUMENTS

WO 2020037304 A1 2/2020
WO 2020055543 A1 3/2020

* cited by examiner

PEDESTAL CARD AND METHODS FOR LIQUID SAMPLE CONTROL AND ASSAY

CROSS-REFERENCING

This application is a National Stage entry (§ 371) application of International Application No. PCT/US21/62282, filed on Dec. 7, 2021, which claims the benefit of priority of U.S. Provisional Patent Application No. 63/122,458, filed on Dec. 7, 2020, the contents of which are relied upon and incorporated herein by reference in their entirety.

The entire disclosure of any publication or patent document mentioned herein is entirely incorporated by reference.

FIELD

Among other things, the present invention is related to devices and methods for liquid sample control and assay in an assay card.

BACKGROUND

In biological and chemical assays (e.g., diagnostic testing), there is a need for making a minute volume sample with an ultra-thin thickness, and for performing different assays at different locations of sample holder without mixing different reagents for different assays.

The present invention addresses both of these issues and provides solutions to these problems.

SUMMARY OF INVENTION

In one or more embodiments, the present invention provides, for example:

A device for liquid sample collection and liquid sample analysis, comprising:

- a base plate having: at least one pedestal area in at least a portion of a sample image area; and at least one recessed area, wherein at least of a portion of the at least one pedestal area is adjacent to the at least one recessed area;
- a cover plate that opposes the base plate, the cover plate covers at least a portion of the pedestal area and at least a portion of the sample image area on the base plate; and
- a plurality of spacers attached to at least one interior opposing surface of at least one of the base plate, the cover plate, or both, wherein the plurality of spacers are situated between the opposable plates, and wherein the spacers regulate the gap between the surface of the pedestal and the surface of the cover plate;
- wherein each plate has a sample contact area; and wherein the opposing base plate and the cover plate define an interior cavity.

In some embodiments, the gap is 150 um or less.

In some embodiments, the device comprises an exterior liquid sample contact area on an exterior location of the device; wherein the interior cavity is in fluid communication with the exterior liquid sample contact area.

In some embodiments, a pedestal of P-CARD comprises a plurality of branches, each has a reagent coated on the surface of the branch.

In some embodiments, a pedestal of P-CARD comprises (a) a plurality of branches, each has a reagent coated on the surface of the branch, and (b) a lead-in pedestal path that connects a sample port with the plurality of branches.

In some embodiments, for a P-CARD with a plurality of branches, each branch comprises a different reagent coated on the surface of the branch; wherein a different reagent for a different assay reaction, wherein a different reagent reaction comprises the reactions for colorimetric assays, immunoassays, nucleic acid assays, cytology assay, cell leasing, staining, H&E staining, in-situ hybridization (IHC) staining, immune-stain (e.g. staining using antibodies) staring, or any combination of thereof.

In some embodiments, for a P-CARD with a plurality of branches, each branch comprises a reagent coated on the surface of the branch; wherein a reagent has a different label, wherein the different label comprises luminescence (e.g., fluorophore, electrochemiluminescence, chemical luminescence, colors, nanoparticles, quantum dots, or any combination thereof.

In some embodiments, a reagent coated at different pedestal branches comprises a different reagent for a different assay reaction, different concentration, different label, or any combination thereof.

The device of any prior embodiment, wherein the exterior liquid sample contact area is a sample entry orifice for receiving the liquid sample.

The device of any prior embodiment, wherein the spacers are attached to one or more pedestal areas and the spacers attached to one or more recessed areas.

The device of any prior embodiment, wherein the spacers are attached to at least one pedestal area of the base plate and to at least one recessed area of the base plate.

The device of any prior embodiment, wherein the spacers are attached to at least one interior surface of the opposable cover plate.

The device of any prior embodiment, wherein the spacers are attached to at least one interior surface of the opposable cover plate.

The device of any prior embodiment, wherein the spacers are attached to at least one interior surface of the base plate.

The device of any prior embodiment, wherein the spacers are attached to at least one interior surface of the base plate.

The device of any prior embodiment, wherein the spacers are attached to at least one interior surface of the opposable cover plate, and the spacers are attached to at least one interior surface of the base plate.

The device of any prior embodiment, wherein the spacers are attached to at least one interior surface of the opposable cover plate, and the spacers are attached to at least one interior surface of the base plate.

The device of any prior embodiment, the spacers located in the pedestal area are shorter than the spacers located in the recessed area.

The device of any prior embodiment, the sample image area on the base plate has an area that fits within a field-of-view of a microscope imager.

The device of any prior embodiment, the sample image area on the base plate has an area that fits within a field-of-view of a microscope imager.

The device of any prior embodiment, the base plate has a raised perimeter that is attached to the cover plate.

The device of any prior embodiment, the base plate is attached to the cover plate at the ends of spacers on the base plate, the cover plate, or both.

The device of any prior embodiment, the base plate is attached to the cover plate by a fastener, a weld, an ultrasonic weld, an adhesive, or a combination thereof.

The device of any prior embodiment, wherein the interior cavity comprises:

(i) a horizontal channel having no vertical walls, wherein the horizontal channel is situated between the pedestal area and the cover plate, wherein the horizontal channel channels a liquid sample from the exterior liquid sample contact area on the exterior location of the device; and (ii) a chamber area having a ceiling, a floor, and walls, defined by the opposable plates, the at least one pedestal area, and the at least one recessed area.

The device of any prior embodiment, wherein the cover plate is attached to the base plate, and the interior cavity is leak-resistant.

The device of any prior embodiment, further comprising a vent from the interior cavity to the exterior of the device.

The device of any prior embodiment, further comprising a liquid sample in at least a portion of the interior cavity between the pedestal area of the base plate and the cover plate.

The device of any prior embodiment, further comprising a monitoring mark.

The device of any prior embodiment, wherein one or more of the spacers are the monitoring mark.

The device of any prior embodiment, wherein the monitoring mark is for estimating true-lateral-dimension (TLD), true volume estimation, imaging at least a portion of the sample contact area, adjusting an image of the liquid sample, processing an image of the liquid sample, or any combination thereof.

The device of any prior embodiment, wherein one or more surfaces of the sample contact area are coated with a coating selected from wettable coating, a non-wettable coating, an intermediate wettability coating, or combinations thereof, wherein the coating influences or controls the meniscus of the liquid sample. In some aspects, the coating is a surfactant or a hydrophobic material. In some aspects, the hydrophobic material is hydrophobic organosilane. In some aspects, the coating comprises a hydrophilic material. In some aspects, the hydrophilic material is selected from a dielectric material, a silicon oxide, a plasma treatment, an ozone treatment, a polymer, an acid-based treatment, a surfactant, or a combination thereof.

The device of any prior embodiment, wherein an additive included in the sample controls the meniscus of the liquid sample. In some aspects, the additive is a surfactant.

The device of any prior embodiment, wherein the width of the pedestal area (i.e., in the x-y plane) is at least 1 μm (micron), at least 2 μm, at least 5 μm, at least 10 μm, at least 50 μm, at least 100 μm, 200 μm, or at least 500 μm. In some aspects, the width of the pedestal area is at least 1 mm, at least 2 mm, at least 3 mm, at least 5 mm, or at least 10 mm. In some aspects, the width of the pedestal area is in the range of 1 μm to 5 mm. In some aspects, the width of the pedestal area is in the range of 0.5 mm to 5 mm.

The device of any prior embodiment, wherein one or more spacers are above the pedestal area. In some aspects, the one or more spacers above the pedestal area have a height of at least 1 μm, at least 2 μm, at least 5 μm, at least 10 μm, at least 50 μm, at least 100 μm, at least 200 μm, at least 500 μm, or at least 1 mm. In some aspects, the one or more spacers above the pedestal area have a height in the range of 1 μm to 1 mm. In some aspects, the one or more spacers above the pedestal area have a height in the range of 2 μm to 200 μm.

The device of any prior embodiment, wherein the height of the pedestal area is at least 1 μm, at least 2 μm, at least 5 μm, at least 10 μm, at least 50 μm, at least 100 μm, at least 200 μm, at least 500 μm, or at least 1 mm. In some aspects, the height of the pedestal area is in the range of 100 μm to 1 mm.

The device of any prior embodiment, wherein the at least one pedestal area has a configuration geometry selected from rectangular; trident; square with rounded corners; circular; rectangular with a plurality of side channels having a vent port situated opposite to the sample port; rectangular with a plurality of side channels having an optional vent port situated opposite to the sample port; square with rounded corners; square with rounded corners having an optional vent port situated opposite the sample port; and like geometries and variations; or combinations thereof. In some aspects, the at least one pedestal area has a rectangular configuration geometry with at least 1, at least 2, at least 3, or at least 4 side channels. In some aspects, the at least one pedestal area has a rectangular configuration geometry with at least 1, at least 2, at least 3, or at least 4 side channels, wherein the at least one pedestal area has a vent port situated opposite to the sample port. In some aspects, the at least one pedestal area has a configuration geometry shown in panel (a), panel (b), panel (c), panel (d), panel (e), or panel (f) of FIG. 6.

The device of any prior embodiment, wherein the at least one pedestal area has a rectangular pedestal structure on the base plate. In some aspects, the at least one pedestal area is configured as shown in panel (a) of FIG. 7.

The device of any prior embodiment, wherein the at least one pedestal area is part of the base plate, the cover plate, or part of both plates. In some aspects, the at least one pedestal area and the plurality of spacers are part of the base plate, the cover plate, or part of both plates. In some aspects, the at least one pedestal area is configured as shown in panel (a) of FIG. 8. In some aspects, the at least one pedestal area and the plurality of spacers are configured as shown in panel (b) of FIG. 8.

The device of any prior embodiment, further comprising a sample introduction port.

The device of any prior embodiment, further comprising a well area, wherein the at least one pedestal area has a narrowed necked pedestal region proximal to the exterior liquid sample contact area or the sample introduction port and a wider pedestal region distal to the exterior liquid sample contact area or the sample introduction port. In some aspects, the at least one pedestal area is configured as shown in FIG. 9.

The device of any prior embodiment, wherein the at least one pedestal area has at least two or at least three pedestal regions branched off the exterior liquid sample contact area or the sample introduction port and a lead-in pedestal path. In some aspects, the branched pedestal regions fill the first pedestal branch region closest to the exterior liquid sample contact area or the sample introduction port with migrating sample before completely filling up the second branch, and likewise for the third branch. In some aspects, the base plate has a thickness of about 0.1 mm to about 10 mm. In some aspects, the base plate has a thickness of about 1 mm. In some aspects, the cover plate has a thickness of about 10 μm to about 500 μm. In some aspects, the cover plate has a thickness of about 175 μm. In some aspects, the plurality of spacers have a pillar height of about 1 μm to about 100 μm. In some aspects, the plurality of spacers have a pillar height of about 30 μm. In some aspects, the at least one pedestal area further comprises an end-of-the-line pedestal region. In some aspects, the end-of-the-line pedestal region serves as a vent, an expansion area, or a liquid overflow path into a well or out of the plate cavity. In some aspects, the at least one pedestal area is configured as shown in FIG. 10.

The device of any prior embodiment, wherein the at least one pedestal area comprises a necked pedestal region connecting to a plurality of pedestal branched paths, wherein the necked pedestal region is proximal to the exterior liquid sample contact area or the sample introduction port, and wherein the plurality of pedestal branched paths are distal to the exterior liquid sample contact area or the sample introduction port. In some aspects, the at least one pedestal comprises at least 2, at least 3, at least 4, at least 5, at least 6, at least 7, or at least 8 pedestal branched paths. In some aspects, the at least one pedestal comprises 8 pedestal branched paths. In some aspects, there is at least one branch region closest to the sample introduction port. In some aspects, there are several branched regions closest to the sample introduction port. In some aspects, there is at least one branch connected to the branch region closest to the sample introduction port. In some aspects, there are at least two, at least three, at least four, at least five, at least six, at least seven, or at least eight branches connected to the branch region closest to the sample introduction port. In some aspects, the pedestal branched paths are configured for different assays that can be performed locally and separately. In some aspects, the assay performed locally for each pedestal branched path includes but not limit to colorimetric assay, immunoassay, cell counting, cell staining, and others. In some aspects, a different assay is performed on different branched pedestal paths of the device. In some aspects, the distance between each branch is 0.5 mm, 1 mm, 2 mm, 5 mm, 10 mm, or in a range between any of these values. In some aspects, shape of each branch is selected from line, round, polygonal, circular, square, rectangular, oval, elliptical, or any combination of the same. In some aspects, the at least one pedestal area is configured as shown in FIG. 11.

The device of any prior embodiment, wherein the at least one pedestal area comprises a lead-in pedestal path and at least two, at least three, at least four, at least five, at least six, or at least seven pedestal regions or branches branched off the sample introduction port and the lead-in pedestal path. In some aspects, the at least one pedestal area comprises a lead-in pedestal path and seven pedestal regions or branches branched off the sample introduction port and the lead-in pedestal path. In some aspects, the cover plate is a top plate having a thickness of about 0.1 mm to about 10 mm. In some aspects, the cover plate is a top plate having a thickness of about 1 mm. In some aspects, the base plate is a bottom plate having a thickness of about 10 μm to about 500 μm. In some aspects, the cover plate has a thickness of about 175 μm. In some aspects, the top plate is an acrylic plate. In some aspects, the top plate is a PMMA plate. In some aspects, the bottom plate is an acrylic plate. In some aspects, the top plate and the bottom plate are acrylic plates. In some aspects, the top plate and the bottom plate are PMMA plates. In some aspects, the bottom plate comprises a pillar array of 30 μm pillar heights. In some aspects, the pedestal regions or branches branched off the sample introduction port are configured for different assays that can be performed locally and separately. In some aspects, the assay performed locally at each branch includes but not limit to colorimetric assay, immunoassay, cell counting, cell staining, and others. In some aspects, a different assay is performed on different branches of the device. In some aspects, the distance between each branch is 0.5 mm, 1 mm, 2 mm, 5 mm, 10 mm, or in a range between any of these values. In some aspects, shape of each branch is selected from line, round, polygonal, circular, square, rectangular, oval, elliptical, or any combination of the same. In some aspects, the at least one pedestal area is configured as shown in FIG. 12.

The device of any prior embodiment, wherein the plurality of spacers comprise a periodic pillar array. In some aspects, the plurality of spacers are attached to the cover plate and comprise a periodic pillar array. In some aspects, the period of spacer on the plate is 10 μm, 20 μm, 30 μm, 50 μm, 100 μm, 150 μm, 200 μm, 300 μm, or in a range between any of these values.

The device of any prior embodiment, wherein one lateral dimension of the pedestal area is at least 1 μm, at least 25 μm, at least 50 μm, at least 100 μm, at least 200 μm, at least 500 μm, at least 1 μm, at least 2 μm, at least 3 μm, at least 5 μm, at least 1 μm, or at least 10 μm. In some aspects, one lateral dimension of the pedestal area is in the range of 1 μm to 10 μm.

The device of any prior embodiment, wherein one vertical dimension of the pedestal area rising above the surface of the well region is at least 50 μm, at least 100 μm, at least 200 μm, at least 500 μm, at least 800 μm, at least 1 mm, at least 10 mm, or at least 50 mm. In some aspects, one vertical dimension of the pedestal area is in the range of 50 μm to 50 mm.

The device of any prior embodiment, wherein the combination of the pedestal area, opposing cover plate, and the optional pillars provide capillary action to migrate the liquid sample and distribute the liquid sample over the pedestal sample region.

The device of any prior embodiment, wherein the pedestal surface has a coating on the top surface of the pedestal. In some aspects, the pedestal surface has a hydrophobic coating, hydrophilic coating, or both hydrophobic and hydrophilic coatings.

The device of any prior embodiment, wherein a coating is on at least one interior opposing surface of at least one of the plates, or both. In some aspects, the coating uses hydrophilic treatment, including but not limit to dielectric material coating, silicon oxide coating, plasma treatment, ozone treatment, polymer coating, acid-base treatment, and surfactant chemical coating.

The device of any prior embodiment, wherein the wetting angle at one interior surface is at least 10°, at least 20°, at least 30°, at least 45°, at least 60°, or at least 75°. In some aspects, the wetting angle at one interior surface is in the range of about 10° to about 75°.

The device of any prior embodiment, wherein the pedestal surface coating comprises a hydrophobic coating.

The device of any prior embodiment, wherein the pedestal surface coating comprises a hydrophilic coating.

The device of any prior embodiment, wherein the pedestal surface coating comprises an ionic, a non-ionic, or both ionic and non-ionic coatings.

The device of any prior embodiment, wherein the pedestal surface coating comprises at least one of trichloro (1H, 1H, 2H, 2H-perfluorooctyl) silane, alkanes, oils, fats, greasy substances, or combinations thereof.

The device of any prior embodiment, wherein one of the plates is fabricated by imprint lithography.

The device of any prior embodiment, wherein one of the plates is fabricated by injection molding.

The device of any prior embodiment, wherein the device is fabricated with the materials of polystyrene, PMMA, PC, COC, COP, or another plastic.

The device of any prior embodiment, wherein one of the plates has a thickness of 200 μm to 1500 μm.

The device of any prior embodiment, wherein one of the plates has a thickness of 50 μm to 250 μm.

The device of any prior embodiment, wherein the size of the spacers on the plate is 5 μm, 10 μm, 20 μm, 30 μm, 50 μm, 100 μm, or in a range between any of these values.

In one or more embodiments, the present invention provides, for example:

A method of making the device of any prior embodiment, comprising:

contacting a first plate with a negative imprint mold to form the base plate having one or more pedestals and one or more recessed areas;

contacting a second plate with a negative imprint mold to form the cover plate having one or more spacers; and combining the two plates into a closed configuration.

In one or more embodiments, the present invention provides, for example:

A method of making the device of any prior embodiment, comprising:

contacting a first plate with a negative imprint mold to form the base plate having one or more pedestals and one or more recessed areas;

contacting a second plate with a negative imprint mold to form the cover plate having one or more spacers; and combining the two plates into a closed configuration.

contacting a first plate with a negative imprint mold to form the base plate having one or more pedestals and one or more recessed areas;

contacting a second plate with a negative imprint mold to form the cover plate having one or more spacers; and combining the two plates into a closed configuration.

In one or more embodiments, the present invention provides, for example:

A method of making a P-CARD device, comprising:

printing the entire device with a 3D printer from a CAD file, wherein the device comprises:

a base plate having at least one pedestal area in at least a portion of a sample image area, and at least one recessed area, wherein at least of a portion of the at least one pedestal area is adjacent to the at least one recessed area;

a cover plate that opposes the base plate, wherein the cover plate covers at least a portion of the pedestal area and at least a portion of the sample image area on the base plate;

a plurality of spacers attached to at least one interior opposing surface of at least one of the base plate, the cover plate, or both, and the plurality of spacers are situated between the opposable plates; and an exterior liquid sample contact area on an exterior location of the device, wherein the base plate and the cover plate define an interior cavity, and the interior cavity is in fluid communication with the exterior liquid sample contact area.

In one or more embodiments, the present invention provides, for example:

A method for analyzing a liquid sample for an analyte, comprising:

contacting the device of any prior embodiment with a liquid sample in the vicinity of the exterior sample contact area;

waiting for a period of time for the contacted sample to imbibe into the interior cavity and spread on the pedestal area of the device and equilibrate to form an equilibrated sample; and analyzing the equilibrated sample for a predetermined analyte in the device with an optical analyzer apparatus.

The method for analyzing a liquid sample for an analyte of any prior embodiment, wherein the step of analyzing the equilibrated sample comprises performing an immunoassay, a nucleic acid assay, a colorimetric assay, a luminescence assay, or any combination thereof. The method for analyzing a liquid sample for an analyte of any prior embodiment, wherein the step of analyzing the equilibrated sample further comprises executing a non-transitory computer medium having an instruction that, when executed, performs, using an algorithm, a determination of trustworthiness of an assay result by analyzing operational variables displayed in an image of a portion of the liquid sample. In some aspects, the algorithm is machine learning, artificial intelligence, statistical methods, or a combination thereof. In some aspects, the step of analyzing the equilibrated sample further comprises using machine learning with a training set to determine if an assay result is trustworthy, wherein the training set uses an operational variable with an analyte in the liquid sample. In some aspects, the step of analyzing the equilibrated sample further comprises using an algorithm to determine if an assay result is trustworthy. In some aspect, the algorithm comprises a machine learning, lookup table, or any combination thereof. In some aspect, the lookup table contains an operational variable with an analyte in the liquid sample. In some aspects, the step of analyzing the equilibrated sample further comprises using a neural network to determine if an assay result is trustworthy, wherein the neural network is trained using an operational variable with an analyte in the liquid sample. In some aspects, the operational variable is an air bubble and/or dust in an image of a portion of the liquid sample. In some aspects, an assay result determined not to be trustworthy is discarded.

The method for analyzing a liquid sample for an analyte of any prior embodiment, wherein the liquid sample comprises cells, tissues, bodily fluids, stool, or any combination thereof.

The method for analyzing a liquid sample for an analyte of any prior embodiment, wherein the liquid sample is amniotic fluid, aqueous humour, vitreous humour, blood, breast milk, cerebrospinal fluid (CSF), cerumen (earwax), chyle, chime, endolymph, perilymph, feces, gastric acid, gastric juice, lymph, mucus, pericardial fluid, peritoneal fluid, pleural fluid, pus, rheum, saliva, sebum (skin oil), semen, sputum, sweat, synovial fluid, tears, vomit, urine, or exhaled breath condensate. In some aspects, the blood is whole blood, fractionated blood, plasma, or serum. In some aspects, the mucus is nasal drainage or phlegm.

The method for analyzing a liquid sample for an analyte of any prior embodiment, wherein the analyte comprises a molecule, a cell, a tissue, a virus, or a nanoparticle. In some aspects, the molecule is a protein, peptide, DNA, RNA, or nucleic acid.

In one or more embodiments, the present invention provides, for example:

A method of performing biological and chemical assays using the device, comprising the steps of:

(a) obtaining a device of the embodiment;

(b) dropping the sample onto the exterior liquid sample contact area;

(c) the sample is guided flow into the device and on top of the pedestal area and into the imaging area;

(d) imaging and analyzing the sample in the imaging area.

The method of performing biological and chemical assays of any prior embodiment, wherein the signal measured in imaging area is cell or particle numbers.

The method of performing biological and chemical assays of any prior embodiment, wherein the signal measured in imaging area is colorimetric intensity.

The method of performing biological and chemical assays of any prior embodiment, wherein the signal measured in imaging area is transmitted light intensity.

The method of performing biological and chemical assays of any prior embodiment, wherein the signal measured in imaging area is fluorescence signal intensity.

The method of performing biological and chemical assays of any prior embodiment, wherein the signal measured in imaging area is transmittance and/or absorptance.

The method of performing biological and chemical assays of any prior embodiment, wherein the parameters measured in imaging area is complete blood count including but not limit to white blood cell count, red blood cell count, platelet count, white blood cell differentiation and count e.g. neutrophils, lymphocytes, monocytes, eosinophils and basophils—as well as abnormal cell types if they are present.

In one or more embodiments, the present invention provides, for example: A method for separating a liquid in the device of any prior embodiment, comprising:

(a) obtaining a liquid sample;
(b) obtaining a device of any prior embodiment;
(c) depositing the sample on one or both of the plates when the plates are configured in the open configuration,
(d) after (c), forcing the two plates into a closed configuration; and the liquid is separated into parts by separation structure or coating in the device.

The method for separating a liquid of any prior embodiment, wherein the separation structure is combined with a separation coating on the surface of the device.

In one or more embodiments, the present invention provides, for example:

A method for separating liquid in the device, comprising:
(a) obtaining a liquid sample;
(b) obtaining a device of any prior embodiment in closed configuration;
(c) depositing the sample on side the plates,
(d) after (c), the liquid is sucked into the device and separated into parts by separation structure or coating in the device.

The method for separating a liquid of any prior embodiment, wherein the separation structure is combined with a separation coating on the surface of the device.

In one or more embodiments, the present invention provides, for example:

A system for analyzing a sample, comprising:
the device of any prior embodiment;
a mobile communication device comprising:
one or a plurality of cameras for detecting, imaging, or detecting and imaging, the sample;
electronics, signal processors, hardware and software for receiving, processing, or both, the detected signal, the image of the sample, or both, and for remote communication; and
a light source from the mobile communication device or from an external source.

BRIEF DESCRIPTION OF THE DRAWINGS

The drawings described below are for illustration purposes only. In some Figures, the drawings are in scale and not to scale in other Figures. For clarity purposes, some elements are enlarged when illustrated in the Figures. The drawings are not intended to limit the scope of the disclosure. The drawings assist in understanding embodiments or aspects of embodiments of the present invention.

DETAILED DESCRIPTION OF EXEMPLARY EMBODIMENTS

Figures 1, 2:
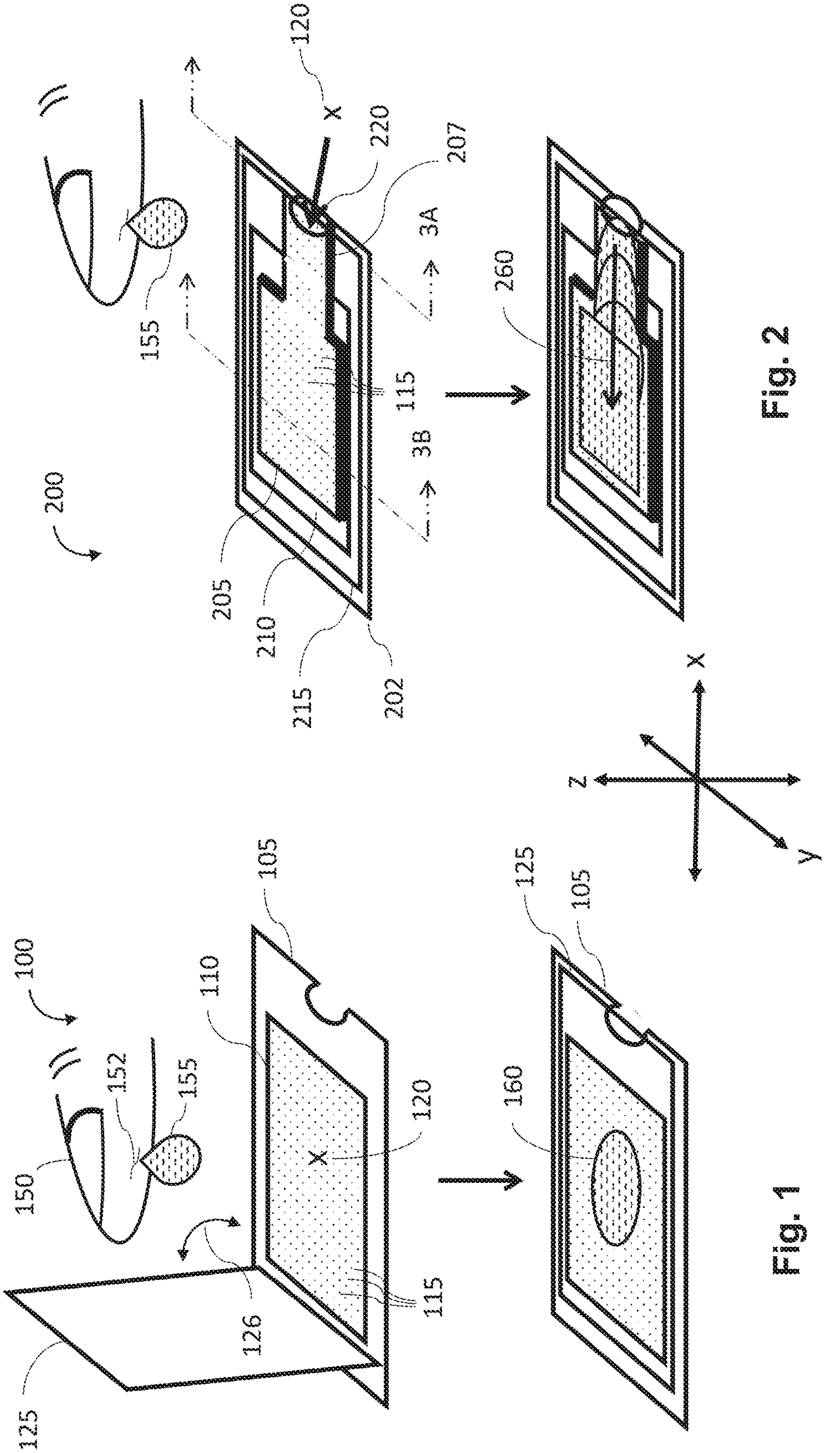
FIG. 1 is an example of a Q-CARD device (100) in a perspective view.
FIG. 2 is an example of the disclosed Pedestal Card or P-CARD device (200) in a perspective view.

The following detailed description illustrates certain embodiments of the invention by way of example and not by way of limitation. If any, the section headings and any subtitles used herein are for organizational purposes only and are not to be construed as limiting the subject matter described in any way. The contents under a section heading and/or subtitle are not limited to the section heading and/or subtitle, but apply to the entire description of the present invention.

Definitions

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

"Pedestal" refers to a physical structure incorporated into a disclosed assay card or a disclosed diagnostic card. A card having a pedestal structure is referred to a pedestal card or "P-CARD", which is distinctly structurally and functionally different from a Q-CARD that does not comprise a pedestal. A single pedestal structure can also support a group of columns, or colonnade, such as one or more "spacers". A pedestal in building architecture can be divided into three parts, from bottom to top: the plinth (or foot), the die (or dado), and the cornice (cap, cap mold, or surbase). In the present disclosure relating to a P-CARD, the pedestal structure can have one, two, or all three of the aforementioned parts, and can have additional structures associated with the pedestal. In some embodiments, a pedestal width can be, for example, greater than its height, equal to its height, less than its height, or a combination thereof. Synonyms for pedestal can include, for example, podium, base, bed, bottom, foot, foundation, mounting, platform, plinth, stand, substructure, support, or like terms, and can be used interchangeably.

The term "diagnostic," as used herein, refers to the use of a method or an analyte for identifying, predicting the outcome of and/or predicting treatment response of a disease or condition of interest. A diagnosis can include predicting the likelihood of or a predisposition to having a disease or condition, estimating the severity of a disease or condition, determining the risk of progression in a disease or condition, assessing the clinical response to a treatment, and/or predicting the response to treatment.

A "condition" as used herein with respect to diagnosing a health condition, refers to a physiological state of mind or body that is distinguishable from other physiological states. A health condition cannot be diagnosed as a disease in some cases. Exemplary health conditions of interest include, but are not limited to, nutritional health; aging; exposure to environmental toxins, pesticides, herbicides, synthetic hormone analogs; pregnancy; menopause; andropause; sleep; stress; prediabetes; exercise; fatigue; chemical balance; etc.

"Analyte" refers to, for example, a molecule (e.g., a protein, peptides, DNA, RNA, nucleic acid, or other molecule), a cell, a tissue, a virus, a bacterium, nanoparticles with different shapes, and like entities. An "analyte" can be any substance that is suitable for testing in the present device and method. In some cases, the "analyte" and "binding entity" and "entity" are interchangeable.

"Assaying", "assay", and like terms refer to a measurement or a characterization of a properties of an analyte in a sample. In some aspects, "assaying," "assay," and like terms refer to testing a sample to detect the presence and/or abundance of an analyte. Methods for the measurement or characterization in an assay, include, but not limited to electrical, optical, magnetic, chemical, or biological measurements. In some aspects, the assay includes the detection and/or measurement of DNA. For example, the assay can include a hybridization reaction that shows the presence and/or amount of the DNA. In some aspects, the assay includes the detection and/or measurement of one or more proteins. For example, the assay can be an immunoassay that uses antibodies and/or antigens for the detections and/or measurement of one or more proteins in the sample. In some aspects, the assay includes the detection and/or measurement of RNA. For example, the assay can include a hybridization reaction that shows the presence and/or amount of the RNA. In some aspects, the assay includes the detection and/or measurement of cell proteins, such as but not limited to cell number, differentiation, proliferation, viability and/or cytotoxicity. In some aspects, the assay includes detection and/or measurement of environmental or food contaminants. In some aspects, the assay includes detection and/or measurement of surfactants, such as but not limited to detergents, wetting agents, emulsifiers, foaming agents, and dispersants. In some aspects, the assay includes a reporter assay, an immunostaining, a nucleic acid microarray, an in situ hybridization, a polymerase chain reaction (PCR), a migration assay, a chemotaxis assay, a secretion assay, an apoptosis assay, a DNA laddering assay, a chemosensitivity assay, a tetramer assay, and a gentamicin protection assay.

"Determining," "measuring," "assessing," or "assaying" can be used interchangeably and include both quantitative and qualitative determinations.

"Light-emitting label" refers to a label that can emit light when under an external excitation, for example, luminescence. Fluorescent labels (which can include dye molecules or quantum dots), and luminescent labels (e.g., electro- or chemi-luminescent labels) are types of light-emitting label. The external excitation can be light (photons) for fluorescence, electrical current for electroluminescence, and a chemical reaction for chemi-luminescence. An external excitation can be a combination of the above.

"Labeled analyte" refers to an analyte that is detectably labeled with a light emitting label such that the analyte can be detected by assessing the presence of the label. A labeled analyte can be labeled directly (i.e., the analyte itself can be directly conjugated to a label (e.g., via a strong bond, e.g., a covalent or non-covalent bond), or a labeled analyte can be labeled indirectly (i.e., the analyte is bound by a secondary capture agent that is directly labeled). "Labeled analyte" and "bound label" can be used interchangeably.

The terms "target analyte," "targeted analyte," or "target entity" refer to a particular analyte that will be specifically analyzed (i.e., detected), or a particular entity that will be specifically bound to the binding site.

The term "a secondary capture agent" which can be referred to as a "detection agent" refers a group of biomolecules or chemical compounds that have highly specific affinity to the antigen. The secondary capture agent can be strongly linked to an optical detectable label, e.g., enzyme, fluorescence label, or can itself be detected by another detection agent that is linked to an optical detectable label through bioconjugation (Hermanson, "Bioconjugate Techniques" Academic Press, 2nd Ed., 2008).

The terms "hybridizing," "hybridization," and "binding," with respect to nucleic acids or polynucleotides, can be used interchangeably. The term "Hybridization" refers to a reaction in which one or more polynucleotides react to form a complex that is stabilized via hydrogen bonding between the bases of the nucleotide residues. The hydrogen bonding can occur by Watson-Crick base pairing, Hoogstein binding, or in any other sequence-specific manner. The complex can comprise two strands forming a duplex structure, three or more strands forming a multi-stranded complex, a single self-hybridizing strand, or any combination of these.

As is known to one skilled in the art, hybridization can be performed under conditions of various stringency. Suitable hybridization conditions are such that the recognition interaction between a capture sequence and a target nucleic acid is both sufficiently specific and sufficiently stable. Conditions that increase the stringency of a hybridization reaction are widely known and published in the art. See, for example, Green and Sambrook, MOLECULAR CLONING: A LABORATORY MANUAL, 4th edition (2012).

The term "capture agent" as used herein, refers to a binding member, e.g. nucleic acid molecule, polypeptide molecule, or any other molecule or compound, that can specifically bind to its binding partner, e.g., a second nucleic acid molecule containing nucleotide sequences complementary to a first nucleic acid molecule, an antibody that specifically recognizes an antigen, an antigen specifically recognized by an antibody, a nucleic acid aptamer that can specifically bind to a target molecule, etc. A capture agent can concentrate the target molecule from a heterogeneous mixture of different molecules by specifically binding to the target molecule. Binding can be non-covalent or covalent. The affinity between a binding member and its binding partner to which it specifically binds when they are specifically bound to each other in a binding complex is characterized by a KD (dissociation constant) of $10^{-5}$ M or less, $10^{-6}$ M or less, such as $10^{-7}$ M or less, including $10^{-8}$ M or less, e.g., $10^{-9}$ M or less, $10^{-10}$ M or less, $10^{-11}$ M or less, $10^{-12}$ M or less, $10^{-13}$ M or less, $10^{-14}$ M or less, $10^{-15}$ M or less, including $10^{-16}$ M or less. "Affinity" refers to the strength of binding, increased binding affinity being correlated with a lower KD.

The term "complementary" as used herein refers to a nucleotide sequence that base-pairs by hydrogen bonds to a target nucleic acid of interest. In the canonical Watson-Crick base pairing, adenine (A) forms a base pair with thymine (T), as does guanine (G) with cytosine (C) in DNA. In RNA, thymine is replaced by uracil (U). As such, A is complementary to T and G is complementary to C. Typically, "complementary" refers to a nucleotide sequence that is fully complementary to a target of interest such that every nucleotide in the sequence is complementary to every nucleotide in the target nucleic acid in the corresponding positions. When a nucleotide sequence is not fully complementary (100% complementary) to a non-target sequence but still can base pair to the non-target sequence due to complementarity of certain stretches of nucleotide sequence to the non-target sequence, percent complementarily can be calculated to assess the possibility of a non-specific (off-target) binding. In general, a complementary of 50% or less does not lead to non-specific binding. In addition, a complementary of 70% or less cannot lead to non-specific binding under stringent hybridization conditions.

"Capture agent/analyte complex" is a complex that results from the specific binding of a capture agent with an analyte. A capture agent and an analyte for the capture agent will usually specifically bind to each other under "specific binding conditions" or "conditions suitable for specific binding", where such conditions are those conditions (in terms of salt concentration, pH, detergent, protein concentration, temperature, etc.), which allow for binding to occur between capture agents and analytes to bind in solution or on surfaces. Such conditions, particularly with respect to antibodies and their antigens and nucleic acid hybridization are known in the art (see, e.g., Harlow and Lane (Antibodies: A Laboratory Manual Cold Spring Harbor Laboratory, Cold Spring Harbor, N.Y. (1989) and Ausubel, et. al, Short Protocols in Molecular Biology, 5$^{th}$ ed., Wiley & Sons, 2002).

The term "specific binding conditions" and "conditions suitable for binding," as used herein with respect to binding of a capture agent to an analyte, e.g., a biomarker, a biomolecule, a synthetic organic compound, an inorganic compound, etc., refers to conditions that produce nucleic acid duplexes or, protein/protein (e.g., antibody/antigen) complexes, protein/compound complexes, aptamer/target complexes that contain pairs of molecules that specifically bind to one another, while, at the same time, disfavor to the formation of complexes between molecules that do not specifically bind to one another. Specific binding conditions are the summation or combination (totality) of both hybridization and wash conditions, and can include a wash and blocking steps, if necessary. For nucleic acid hybridization, specific binding conditions can be achieved by incubation at 42° C. in a solution: 50% formamide, 5×SSC (150 mM NaCl, 15 mM trisodium citrate), 50 mM sodium phosphate (pH 7.6), 5×Denhardt's solution, 10% dextran sulfate, and 20 μg/ml denatured, sheared salmon sperm DNA, followed by washing the filters in 0.1×SSC at about 65° C.

A "biomarker," as used herein, is any molecule or compound that is found in a sample of interest and that is known to be diagnostic of or associated with the presence of or a predisposition to a disease or condition of interest in the subject from which the sample is derived. Biomarkers include, but are not limited to, polypeptides or a complex thereof (e.g., antigen, antibody), nucleic acids (e.g., DNA, miRNA, mRNA), drug metabolites, lipids, carbohydrates, hormones, vitamins, etc., that are known to be associated with a disease or condition of interest.

For binding of an antibody to an antigen, specific binding conditions can be achieved by blocking a first plate containing antibodies in blocking solution (e.g., PBS with 3% BSA or non-fat milk), followed by incubation with a sample containing analytes in diluted blocking buffer. After this incubation, the first plate is washed in washing solution (e.g., PBS+TWEEN 20) and incubated with a secondary capture antibody (detection antibody, which recognizes a second site in the antigen). The secondary capture antibody can be conjugated with an optical detectable label, e.g., a fluorophore such as IRDye800CW, Alexa 790, Dylight 800. After another wash, the presence of the bound secondary capture antibody can be detected. One of ordinary skill in the art would be knowledgeable as to the parameters that can be modified to increase the signal detected and to reduce the background noise.

The term "label" refers to a molecule or a nanoparticle that can give an optical signal (a) on its own or (b) through a reaction.

The term "antibody," as used herein, means a protein consisting of one or more polypeptides substantially encoded by all or part of the recognized immunoglobulin genes.

The recognized immunoglobulin genes, for example in humans, include the kappa (κ), lambda (λ), and heavy chain genetic loci, which together comprise the myriad variable region genes, and the constant region genes mu (μ), delta (δ), gamma (γ), sigma (σ), and alpha (α) which encode the IgM, IgD, IgG, IgE, and IgA antibody "isotypes" or "classes" respectively. Antibody herein is meant to include full length antibodies and antibody fragments, and can refer to a natural antibody from any organism, an engineered antibody, or an antibody generated recombinantly for experimental, therapeutic, or other purposes. The term "antibody" includes full length antibodies, and antibody fragments, as are known in the art, such as Fab, Fab', F(ab')2, Fv, scFv, or other antigen-binding subsequences of antibodies, either produced by the modification of whole antibodies or those synthesized de novo using recombinant DNA technologies.

The terms "antibody epitope," "epitope," and "antigen" are used interchangeably herein to refer to a biomolecule that is bound by an antibody. Antibody epitopes can include proteins, carbohydrates, nucleic acids, hormones, receptors, tumor markers, and the like, and mixtures thereof. An antibody epitope can be a group of antibody epitopes, such as a particular fraction of proteins eluted from a size exclusion chromatography column. Still further, an antibody epitope can be identified as a designated clone from an expression library or a random epitope library.

The term "marker" or "biomarker", as used in describing a biological sample, refers to an analyte whose presence or abundance in a biological sample is correlated with a disease or condition.

The term "sample introduction port", "sample port" "inlet", "sample entry orifice" or "opening" are interchangeable.

The terms "finger" and "branches" of a pedestal are interchangeable.

A "subject" can be any human or non-human animal. A subject can be a person performing the instant method, a patient, a customer in a testing center, and like individuals.

The term "lateral area" refers to the area that is in parallel with the plate.

The terms "polypeptide", "peptide" and "protein" are used interchangeably herein to refer to polymers of amino acids of any length. The polymer can be linear or branched, it can comprise modified amino acids, and it can be interrupted by non-amino acids. The terms encompass an amino acid polymer that has been modified; for example, disulfide bond formation, glycosylation, lipidation, acetylation, phosphorylation, or any other manipulation, such as conjugation with a labeling component. The terms include fusion proteins, including, but not limited to, fusion proteins with a heterologous amino acid sequence, fusions with heterologous and homologous leader sequences, with or without N-terminal methionine residues; immunologically tagged proteins; fusion proteins with detectable fusion partners, e.g., fusion proteins including as a fusion partner a fluorescent protein, P-galactosidase, luciferase, etc.; and the like. As used herein the term "amino acid" refers to either natural and/or unnatural or synthetic amino acids, including glycine and both the D or L optical isomers, and amino acid analogs and peptidomimetics.

The terms "polynucleotide", "nucleotide", "nucleotide sequence", "nucleic acid", "nucleic acid molecule", "nucleic acid sequence" and "oligonucleotide" are used interchangeably, and can include plurals of each respectively depending on the context in which the terms are utilized. They refer to a polymeric form of nucleotides of any length, either deoxyribonucleotides (DNA) or ribonucleotides (RNA), or analogs thereof.

Polynucleotides can have any three-dimensional structure, and can perform any function, known or unknown. The following are non-limiting examples of polynucleotides: coding or non-coding regions of a gene or gene fragment, loci (locus) defined from linkage analysis, exons, introns, messenger RNA (mRNA), transfer RNA (tRNA), ribosomal RNA, ribozymes, small interfering RNA, (siRNA), microRNA (miRNA), small nuclear RNA (snRNA), cDNA, recombinant polynucleotides, branched polynucleotides, plasmids, vectors, isolated DNA (A, B and Z structures) of any sequence, PNA, locked nucleic acid (LNA), TNA (threose nucleic acid), isolated RNA of any sequence, nucleic acid probes, and primers. LNA, often referred to as inaccessible RNA, is a modified RNA nucleotide. The ribose moiety of an LNA nucleotide is modified with an extra bridge connecting the 2' and 4' carbons. The bridge "locks" the ribose in the 3'-endo structural conformation, which is often found in the A-form of DNA or RNA, which can significantly improve thermal stability.

The terms "ribonucleic acid" and "RNA" as used herein mean a polymer composed of ribonucleotides.

The terms "deoxyribonucleic acid" and "DNA" as used herein mean a polymer composed of deoxyribonucleotides.

The term "oligonucleotide" as used herein denotes single stranded nucleotide multimers of from about 10 to 200 nucleotides and up to 300 nucleotides in length, or longer, e.g., up to 500 nucleotides in length or longer. Oligonucleotides can be synthetic and, in certain embodiments, are less than 300 nucleotides in length.

The term "sample" as used herein relates to a material or mixture of materials containing one or more analytes or entity of interest. In some aspects, the sample is a liquid sample. In some aspects, the sample or liquid sample can be obtained from a biological sample such as cells, tissues, bodily fluids, and stool. In some aspect, the liquid sample is a bodily fluid of interest, which includes but is not limited to, amniotic fluid, aqueous humour, vitreous humour, blood (e.g., whole blood, fractionated blood, plasma, serum), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine, exhaled condensate, and any combination thereof. In some aspects, a sample or liquid sample can be obtained from a subject, e.g., a human, and it can be processed prior to use in the subject assay. For example, prior to analysis, the protein/nucleic acid can be extracted from a tissue sample prior to use, methods for which are known. In some aspects, the sample or liquid sample can be a clinical sample, e.g., a sample collected from a patient. In some aspects, the sample or liquid sample can be a diagnostic sample, such as saliva, serum, blood, sputum, urine, sweat, lacrima, semen, or mucus. In some aspects, the sample or liquid sample can be an environmental sample. An environmental sample" refers to any sample that is obtained from the environment. An environmental sample can include liquid samples from a river, lake, pond, ocean, glaciers, icebergs, rain, snow, sewage, reservoirs, tap water, drinking water, etc.; solid samples from soil, compost, sand, rocks, concrete, wood, brick, sewage, etc.; and gaseous samples from the air, underwater heat vents, industrial exhaust, vehicular exhaust, etc. In some aspects, samples that are not in liquid form are converted to liquid form before analyzing the sample with the present invention.

The term "entity" or "analyte" refers to, but not limited to, proteins, peptides, DNA, RNA, nucleic acid, molecules (small or large), cells, tissues, viruses, nanoparticles with different shapes, that would bind to a "binding site". The entity includes the capture agent, detection agent, and blocking agent. The "entity" includes the "analyte", and the two terms are used interchangeably.

The term "binding site" refers to a location on a solid surface that can immobilize "entity" in a sample.

The term "smart phone," or "mobile phone", which are used interchangeably, refers to the type of phones that has a camera and communication hardware and software that can take an image using the camera, manipulate the image taken by the camera, and communicate data to a remote place. In some embodiments, the Smart Phone has a flash light.

A "processor," "communication device," "mobile device," and "mobile communication device" refer to computer systems that contain basic electronic elements (including one or more of a memory, input-output interface, central processing unit, instructions, network interface, power source, etc.) to perform computational tasks. The computer system can be a general purpose computer that contains instructions to perform a specific task, or can be a special-purpose computer.

The term "light" refers to, unless specifically specified, an electromagnetic radiation with various wavelength.

The term "period" of periodic structure array refers to the distance from the center of a structure to the center of the nearest neighboring identical structure.

The term "storage site" refers to a site of an area on a plate, wherein the site contains reagents to be added into a sample, and the reagents are capable of being dissolving into the sample that is in contract with the reagents and diffusing in the sample.

The term "pedestal area" refers to an area that raised from an area that surrounds the pedestal area.

The term "recessed area" refers to an area that is a neighboring area. The term "periodic spacers" refers to a spacing between the spacers is periodic.

The term "relevant" means that it is relevant to detection of analytes, quantification and/or control of analyte or entity in a sample or on a plate, or quantification or control of reagent to be added to a sample or a plate.

The term "hydrophilic", "wetting", or "wet" of a surface means that the contact angle of a sample on the surface is less than 90 degrees.

The term "hydrophobic", "non-wetting", or "does not wet" of a surface means that the contact angle of a sample on the surface is equal to or larger than 90 degrees.

The term "variation" of a quantity refers to the difference between the actual value and the desired value or the average of the quantity. And the term "relative variation" of a quantity refers to the ratio of the variation to the desired value or the average of the quantity. For example, if the desired value of a quantity is Q and the actual value is (Q+Δ), then the Δ is the variation and the Δ/(Q+Δ) is the relative variation. The term "relative sample thickness variation" refers to the ratio of the sample thickness variation to the average sample thickness.

The term "optical transparent" or "optically transparent" refers to a material that allows a transmission of an optical signal, wherein the term "optical signal" refers to, unless specified otherwise, the optical signal that is used to probe a property of the sample, the plate, the spacers, the scale-marks, any structures used, or any combinations of thereof.

A "CROF Card (or card)", "COF Card", "QMAX-Card", "Q-CARD", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF card) that regulate the spacing between the plates. The term "X-plate" refers to one of the two plates in a CROF card, wherein the spacers are fixed to this plate. More descriptions of the COF Card, CROF Card, and X-plate are in the abovementioned U.S. Provisional Application No. 62/456,065. "CROF" is an acronym describing a sample card having two opposing plates and separating spacers, and the following attributes: "Compressed (i.e., by a force), Regulated (i.e., plate separation and sample layer thickness), and Open Flow (i.e., of a liquid or sample within the opposed plates).

The terms describing the disclosed devices/apparatus, systems, and methods, are defined in the current application or, for example: in PCT Application (designating U.S.) Nos. PCT/US2016/046437 and PCT/US2016/051775, filed Aug. 10, 2016 and Sep. 14, 2016, respectively; and US Provisional Application Nos. 62/456,065, filed Feb. 7, 2017; 62/456,287, filed Feb. 8, 2017; and 62/456,504, filed Feb. 8, 2017, all incorporated in this application in their entirety.

The practice of various embodiments of the present disclosure employs, unless otherwise indicated, conventional techniques of immunology, biochemistry, chemistry, molecular biology, microbiology, cell biology, genomics and recombinant DNA, which are within the skill of the art. See Green and Sambrook, MOLECULAR CLONING: A LABORATORY MANUAL, 4th edition (2012); CURRENT PROTOCOLS IN MOLECULAR BIOLOGY (F. M. Ausubel, et al. eds., (1987)); the series METHODS IN ENZYMOLOGY (Academic Press, Inc.): PCR 2: A PRACTICAL APPROACH (M. J. MacPherson, B. D. Hames and G. R. Taylor eds. (1995)), Harlow and Lane, eds. (1988) ANTIBODIES, A LABORATORY MANUAL, and ANIMAL CELL CULTURE (R. I. Freshney, ed. (1987)).

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

One with skill in the art will appreciate that the present invention is not limited in its application to the details of construction, the arrangements of components, category selections, weightings, pre-determined signal limits, or the steps set forth in the description or drawings herein. The invention is capable of other embodiments and of being practiced or being carried out in many different ways.

Descriptions

Referring to the Figures, according to the present invention, a Q-CARD device (100) or (200) for preparing a sample and for assaying the sample, comprising two plates (a base plate and a cover plate) and spacers. Each plate has a sample contact area for contacting a sample that contains or is suspected of containing an analyte. During an assaying of a sample, the sample thickness is regulated by the gap (i.e., the spacing) between the two plates and the gap is, in turn, regulated by the spacers between the two plates.

According to the present invention, the base plate comprises a pedestal that shapes, when combining with the cover plate, a lateral dimension of a liquid sample is regulated by the shape of the edge of the pedestal, due to a capillary force.

In some embodiments, at least one spacer is in the sample contact area.

In some embodiments, a Q-CARD device comprises at two operation modes: (i) top sample deposition mode and (ii) lateral sample deposition mode.

In the top sample deposition mode, as illustrated in FIG. 1, the two plates are movable from each other, having an open configuration and a closed configuration. A sample is deposited at an open configuration, wherein the sample is deposited on one or both of the plates. Then the two plates are brought together to form a closed configuration, wherein at least a part of the sample has its thickness regulated by the plates and the spacers.

In the lateral sample deposition mode, before a deposition of a sample, the two plates already face each other with the gap between the two plates regulated by the spacers, wherein a sample is deposited at an edge of the plates, and is drawn inside of the gap between the two plates by a capillary force.

FIG. 1 is, in a perspective view, an example of a Q-CARD device (100) for the top sample deposition mode. The device (100) in an open configuration or sample depositing configuration (upper), has a base plate (105) with a sample area (110) having spacers (115) and an optional drop target ("x") mark (120) for receiving a deposited sample. The device (100) has a closable cover plate (125) with an optional hinge (not shown) between plate (105) and plate (125) that can permit the hinge to swivel (126) to provide definitive closure for plate orientation and desired contact relationships. The sample can be from any suitable source, for example, puncturing (152) a human digit (150) provides a sample of a blood droplet (155). After depositing a sample, the cover plate (125) and the base plate (105) are brought into an opposing closed configuration, that makes the deposited sample (160) spreads on the sample contact area. In some embodiments, an optional temporary force (e.g., human or robotic) applied to one or both faces of the plates can ensure the cavity between the opposed plates creates a uniform thickness and volume of the sample layer in the sample contact area. The uniform sample layer can be analyzed for a desired analyte in the sample region.

For the device (100), the pedestal can break a liquid sample into the sample of pedestal, due to the capillary force. This is because that the gap between the two plates in the pedestal area smaller than that outside the pedestal area, which, in turn, has a larger capillary pulling force to pull a liquid into the smaller gap, FIG. 2 is, in a perspective view, an example of the disclosed Pedestal Card or P-CARD device (200) for the lateral sample deposition mode. The device (200), in an assembled pre-closed or pre-sealed configuration, has a base plate (202), a cover plate (215) situated over the base plate, an enclosed or covered sample area defined by the pedestal area (205), a recessed area or recessed region or well area (210), a necked pedestal region (207), spacers (115) in the pedestal area, a sample introduction port or opening (220) at an edge of the plated, and an optional drop target ("x") mark (120) for receiving a deposited sample. The device (200) is configured that a sample deposited at the sample port (220) will be drawn into sample contact area of the pedestal by capillary force.

For the device (200), the pre-closed configuration has a defined plate orientation, defined separation, and defined interior dimensions that provide the desired spacing between the surface of the pedestal region and the cover plate (215). The sample can be, for example, a portion of a blood droplet (155) from a finger prick or a sample transporter device such as a test tube, pipette, capillary tube, spotter, and like devices. The sample is deposited at, on, or near the sample port (220), such as at, on, or near an optional drop target ("x") mark (120). The deposited sample migrates, due to capillary force, inwardly from the sample port (220) to the necked pedestal region (207) if present, and continues onward to a main pedestal area (205) (shown), or additionally or alternatively, to other associated pedestal area(s) (not shown) (see other geometries in FIG. 6). Since the pedestal generating dimensions such as the thickness or gap between the pedestal surface and the cover plate are predetermined in manufacture, there is no need for an operator or robot to apply a temporary force to one or both faces of the plates to create a uniform thickness and volume of the sample layer in the pedestal sample area. The (i.e., significant migration no longer observed) sample layer having a uniform thickness and uniform volume within the P-CARD and on the pedestal can be analyzed with any suitable method for a targeted analyte within the pedestal sample region such as microscopy.

Shaping a Sample and Controlling Assay Reaction Location Using Pedestal

In some embodiments, the function of pedestal is not only for shaping a lateral dimension of a liquid sample, but also for controlling the location of an assay reaction of the sample with reagent, and/or for multiplexing of multiple of assay reactions at different locations (i.e., multiple assay reactions on the same device).

For example, as illustrated in FIG. 6E, the pedestal has a shape of multiple branches (e.g. four branches as shown), wherein the multiple branches are connected to the sample port through a lead-in pedestal path; wherein the each finger of the pedestal is coated with a different reagent and/or the same regent with different concentrations, and wherein, when a liquid sample flow into the branches from the sample port (220), the reagent in each pedestal finger interacts with the sample flow into the finger, without mixing with the reagent in the other fingers. Such design has an advantage over the design of a lateral flow device, wherein a sample flows through several different reagent locations that leads to a mixing of the different reagents.

In some embodiments, a pedestal of P-CARD comprises a plurality of branches, each has a reagent coated on the surface of the branch.

In some embodiments, a pedestal of P-CARD comprises (a) a plurality of branches, each has a reagent coated on the surface of the branch, and (b) a lead-in pedestal path that connects a sample port with the plurality of branches.

In some embodiments, for a P-CARD with a plurality of branches, each branch comprises a different reagent coated on the surface of the branch; wherein a different reagent for a different assay reaction, wherein a different reagent reaction comprises the reactions for colorimetric assays, immunoassays, nucleic acid assays, cytology assay, cell leasing, staining, H&E staining, in-situ hybridization (IHC) staining, immune-stain (e.g. staining using antibodies) staring, or any combination of thereof.

In some embodiments, for a P-CARD with a plurality of branches, each branch comprises a reagent coated on the surface of the branch; wherein a reagent has a different label, wherein a different labels comprises luminescence (e.g. fluorophore, electrochemicalluminscence, chemical luminescence, colors, nanoparticles, quantum dots, or any combination thereof.

In some embodiments, a reagent coated at different pedestal branches comprises a different reagent for a different assay reaction, different concentration, different label, or any combination thereof.

Figure 3A:
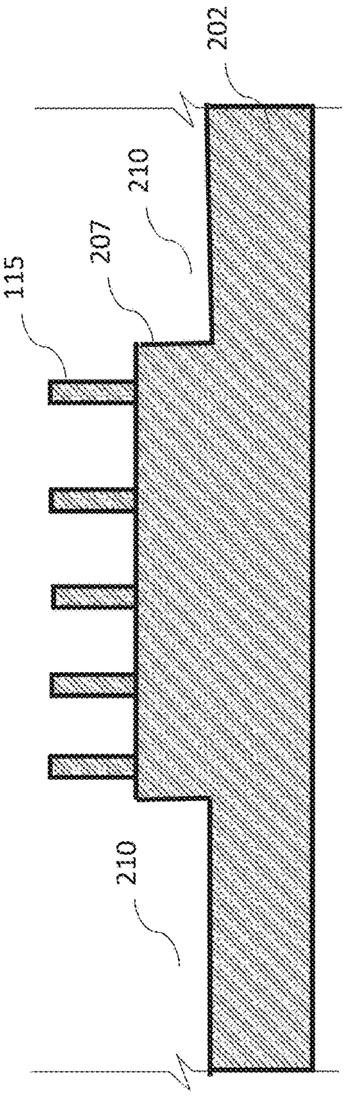
FIGS. 3A-3B show cross section views at section lines (FIG. 3A) and of the base (202) (FIG. 3B) of a version (i.e., with the cover plate absent for clarity) of the assembled device shown in FIG. 2.
Figure 3B:
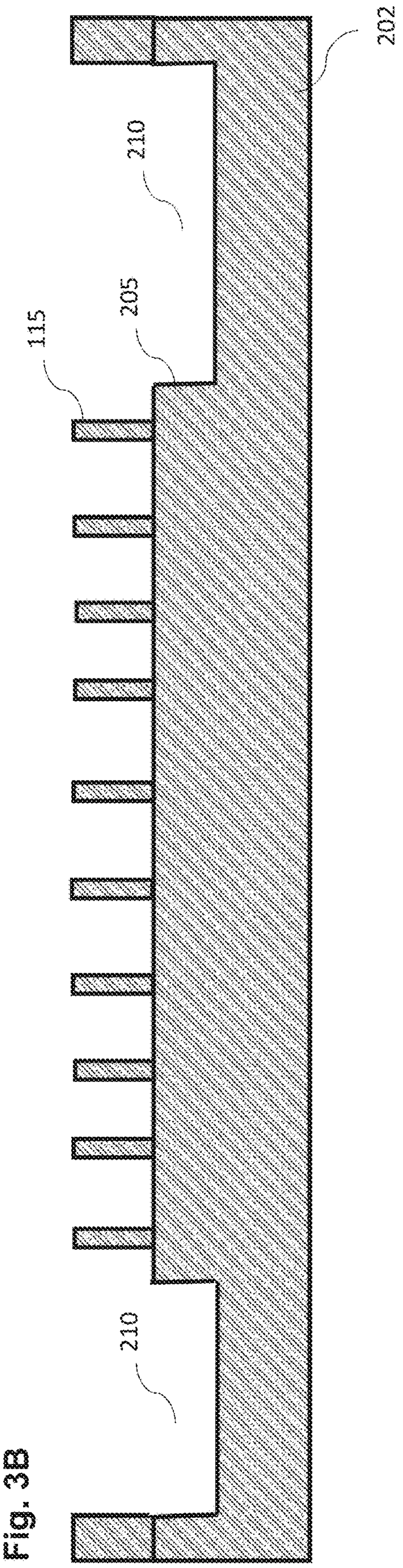

FIG. 3 shows cross section views 3A and 3B of a pre-assembled version (with the cover plate absent for clarity) of the assembled device shown in FIG. 2. FIG. 3A is a portion of a cross-section view near the sample entry port (220) and the pedestal necked region (207) showing the pedestal feature, the attached spacers (115), and the surrounding well regions (210), associated with the engineered base plate (202). Similarly, FIG. 3B is a cross section view near the middle of the main pedestal region or pedestal area (205) showing the pedestal, the attached spacers (115), and the well regions (210), associated with the engineered base plate (202). The spacers shown are for illustration. The number, and relative size and scale of spacers shown are not representative of actual structures since the plate can be considerably larger than the spacers.

Figure 4A:
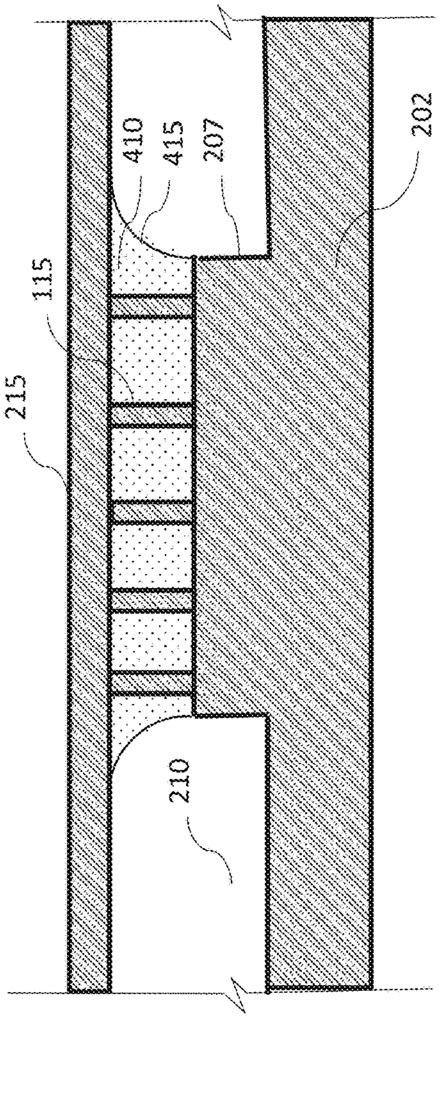
FIGS. 4A-4B show cross section views at section lines (FIG. 4A) and of the base (202) (FIG. 4B) of the assembled card device shown in FIG. 2 (lower) having the cover plate (215) in place and a sample (410) present.
Figure 4B:
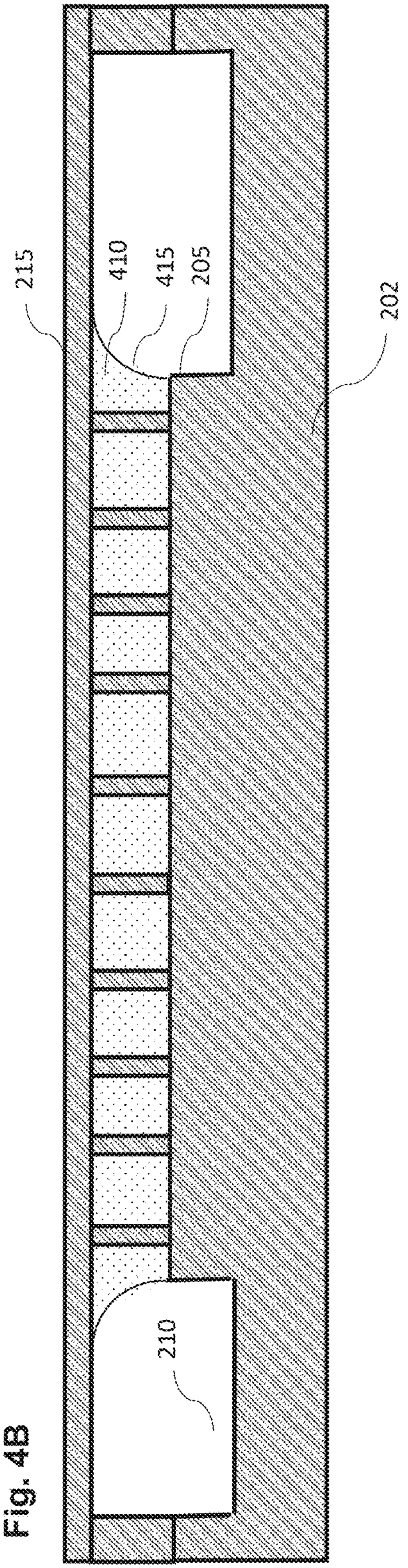

FIG. 4 shows cross section views at section lines 3A and 3B, respectively of the assembled card device shown in FIG. 2 (lower) having the cover plate (215) in place and sample (410) present. FIG. 4A is a portion of a cross-section near the sample entry port and the pedestal necked region (207) showing the pedestal stepped region, the attached spacers (115), the well regions (210), the sample (410), and the sample meniscus (415), associated with the combined base plate (202) and the cover plate (215). Similarly, FIG. 4B is a cross-section near the middle of the main pedestal region (205) showing the wider pedestal stepped region, the attached spacers (115), the well regions (210), the sample (410), and the sample meniscus (415), associated with the combined base plate (202), and the cover plate (215). The spacers shown are for illustration. The number and relative size and scale of spacers shown are not representative of actual structures since the plate can be considerably larger than the spacers. In some embodiments, the sample meniscus (415) can be influenced or controlled by, for example, selection of the materials of construction for the plates and spacers, the choice of a coating or coatings (e.g., wettable, non-wettable, or intermediate wettability, or combinations thereof) on one or more of the sample contact surfaces, additives included in the sample (e.g., a surfactant), or a combination thereof. Preferred plate coatings can be, for example, surfactants, or hydrophobic materials such as a hydrophobic organosilane.

In some embodiments, the coating can include a hydrophilic treatment having, for example, a dielectric material, a silicon oxide, a plasma treatment, an ozone treatment, a polymer, an acid-base treatment, a surfactant, or a combination thereof.

In some embodiments, the width of the pedestal (i.e., in the x-y plane) can be, for example, 1 μm (micron), 2 μm, 5 μm, 10 μm, 50 μm, 100 μm, 200 μm, or 500 μm, including intermediate values and ranges.

In some embodiments, the width of the pedestal can be, for example, 1 mm, 2 mm, 3 mm, 5 mm, or 10 mm, including intermediate values and ranges.

In some embodiments, a preferred width of pedestal can be, for example, in the range of 0.5 mm to 5 mm.

In some embodiments, the height of the pedestal can be, for example, 1 μm, 2 μm, 5 μm, 10 μm, 50 μm, 100 μm, 200 μm, 500 μm, or 1 mm, including intermediate values and ranges.

The preferred height of pedestal is 100 μm, 200 μm, 500 μm, 1 mm or in a range between any of these values.

In some embodiments, the spacer above the pedestal can have a height of, for example, 1 μm, 2 μm, 5 μm, 10 μm, 50 μm, 100 μm, 200 μm, 500 μm, 1 mm, including intermediate values and ranges.

In some embodiments, a preferred spacer above the pedestal can have a height of, for example, 2 μm, 5 μm, 10 μm, 50 μm, 100 μm, or 200 μm, including intermediate values and ranges.

FIG. 5 shows cross section views of pre-assembly (i.e., exploded assembly) drawings of exemplary pedestal structures and spacers.

Figure 5A:
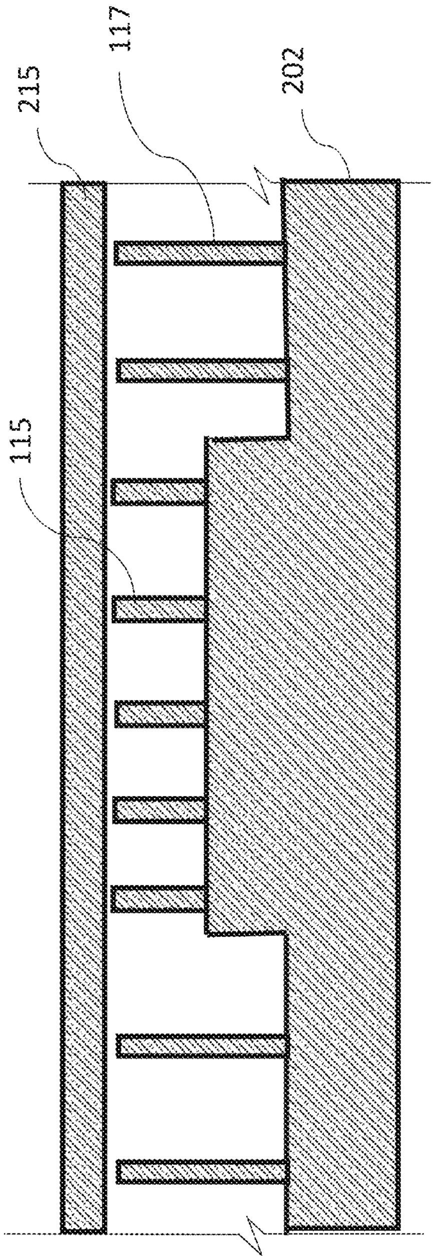
FIG. 5 show cross section views of pre-assembly (i.e., exploded assembly) drawings of two exemplary pedestal structures and spacers showing alternative spacer attachment to the base plate (FIG. 5A) and the cover plate (FIG. 5B), respectively.

FIG. 5A shows a preferred embodiment having the spacers (115) attached to the base plate (202), and having short spacers (115) and long spacers (117) projecting and separating the base and cover plates in the pedestal area and in the well area when assembled. The base plate (202) having attached spacers is subsequently bonded to the cover plate (215), for example, with a suitable adhesive, a clamp, ultrasonic welding, and like suitable bonding methods and materials.

Figure 5B:
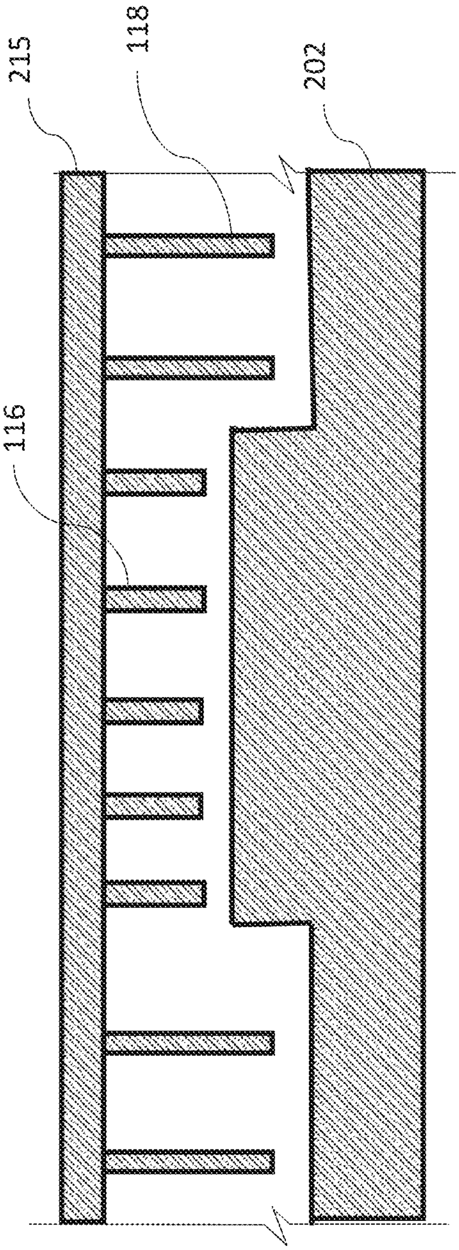

FIG. 5B shows another embodiment having the spacers attached to the cover plate (215), and the short spacers (116) and long spacers (118) project and separate the base and cover plates in the pedestal area and in the well area when assembled. The cover plate (215) having attached spacers is subsequently bonded to the base plate (202), for example, with a suitable adhesive, a clamp, ultrasonic welding, and like suitable bonding methods and materials.

Figure 6:
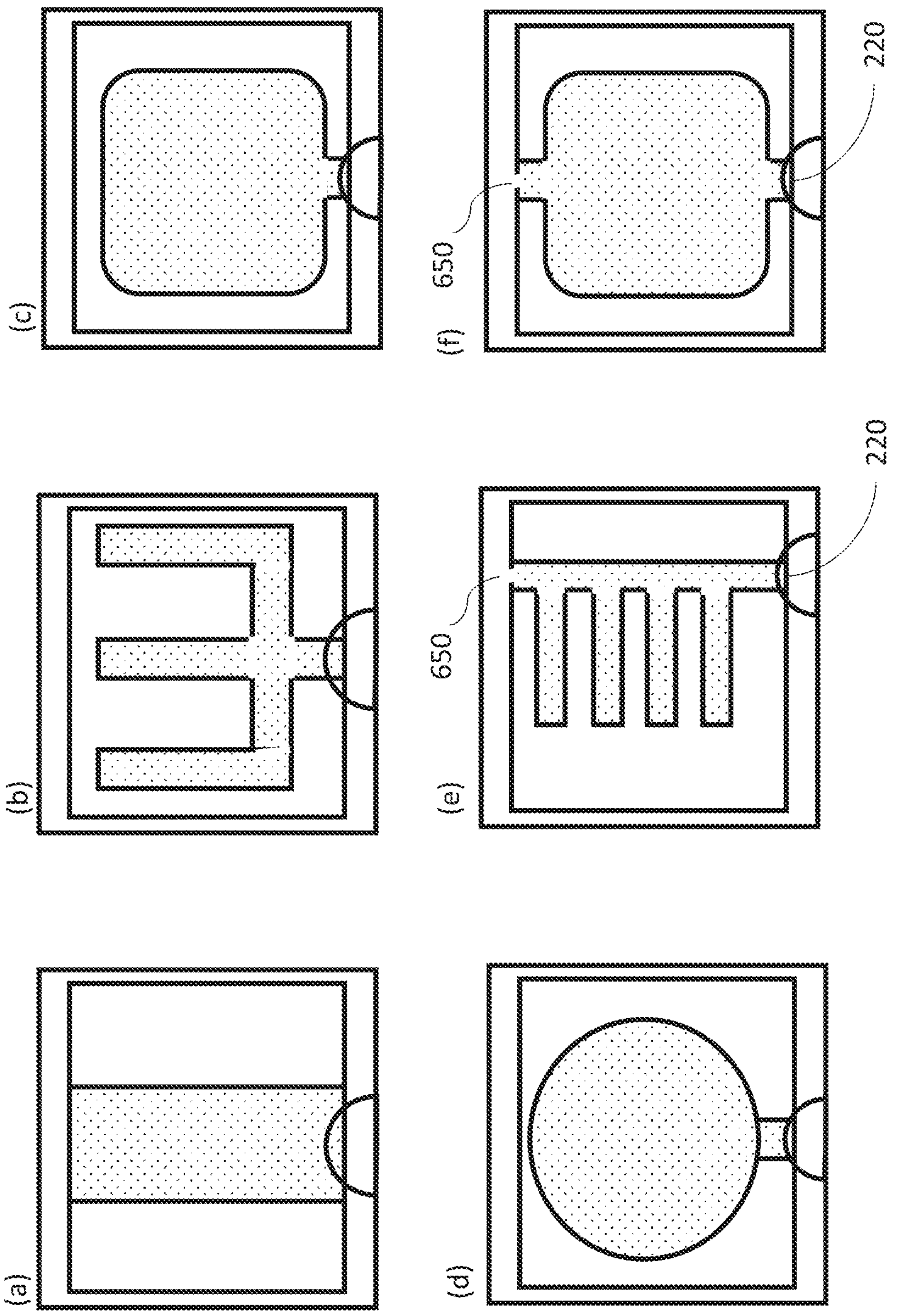
FIG. 6 shows plan views of exemplary pedestal configuration geometries (a-f) in the P-CARD device having optional spacers in the pedestal surface region.

FIG. 6 shows plan views of exemplary pedestal configuration geometries in the P-CARD device having optional spacers in the pedestal surface region. Some representative geometries can be, for example: (a) rectangular; (b) trident; (c) square with rounded corners; (d) circular; I rectangular with a plurality of side channels (i.e. branches) (4 shown) and (f) a lead-in pedestal path that connects sample introduction port with the plurality of side channels (branches).

In some embodiments, the device comprises an optional vent port (650) situated opposite the sample port (220); and (f) square with rounded corners having an optional vent port (650) situated opposite the sample port (220); and like geometries and variations; or combinations thereof.

Figure 7:
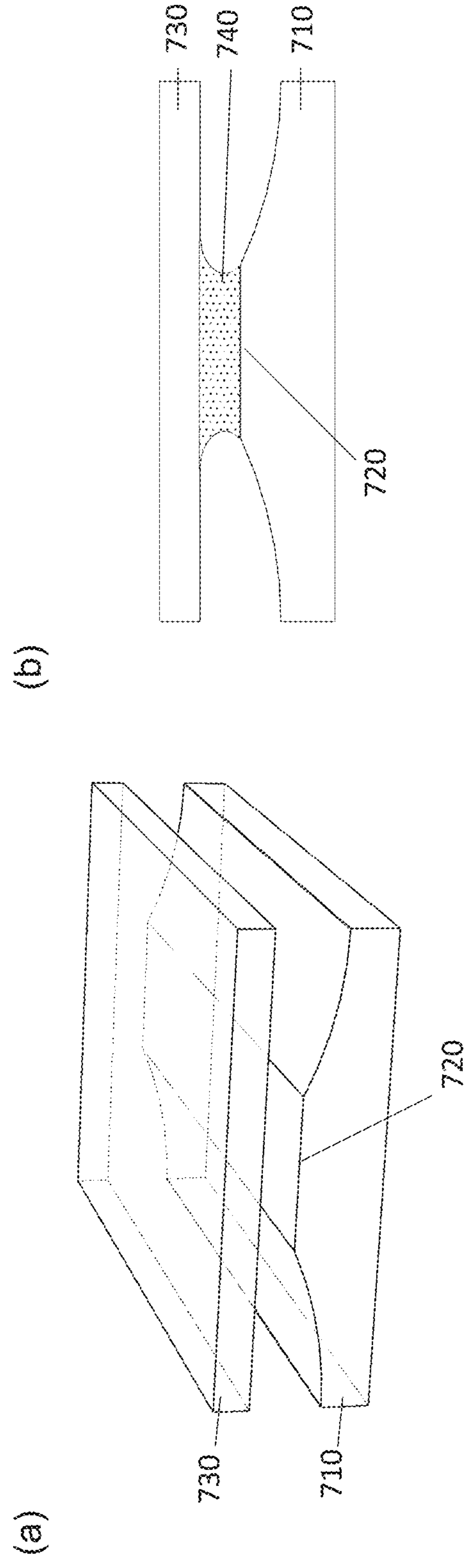
FIG. 7 shows a perspective (a) view and cross section (b) view of an exemplary P-CARD device.

FIG. 7 shows example views of an exemplary P-CARD having a base plate (710), a rectangular pedestal (720) structure on the base, and a cover plate (730), in a perspective view (a) and in a cross-section view (b). Cross section view (b) also shows a liquid sample (740) confined in the gap between the pedestal (720) upper surface and the interior surface of the cover plate (730). Optional spacers are not shown.

Figure 8:
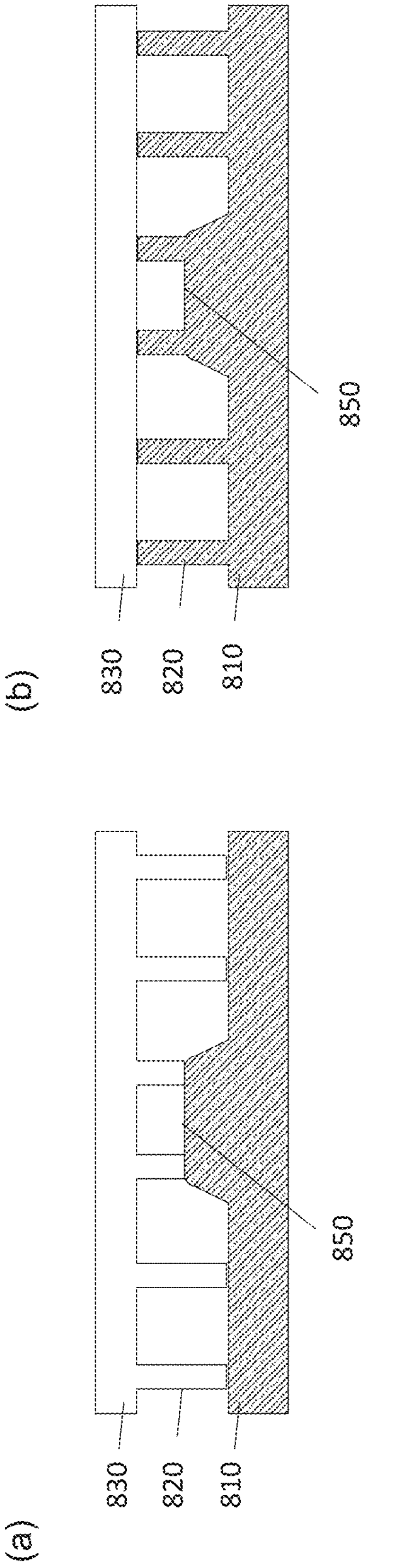
FIG. 8 shows alternative cross section views of another exemplary P-card device having spacers attached to the cover (a) or the base (b) plate.

FIG. 8 shows views of an exemplary P-CARD device having a base plate (810), and a cover plate (830). A pedestal region (850) can be part of the base plate, the cover plate, or part of both plates (not shown). Optional spacers (820) can be attached to the cover plate (as shown in (a)), attached to the base plate (as shown in (b)), or attached to both the base plate and the cover plate (not shown).

Figure 9:
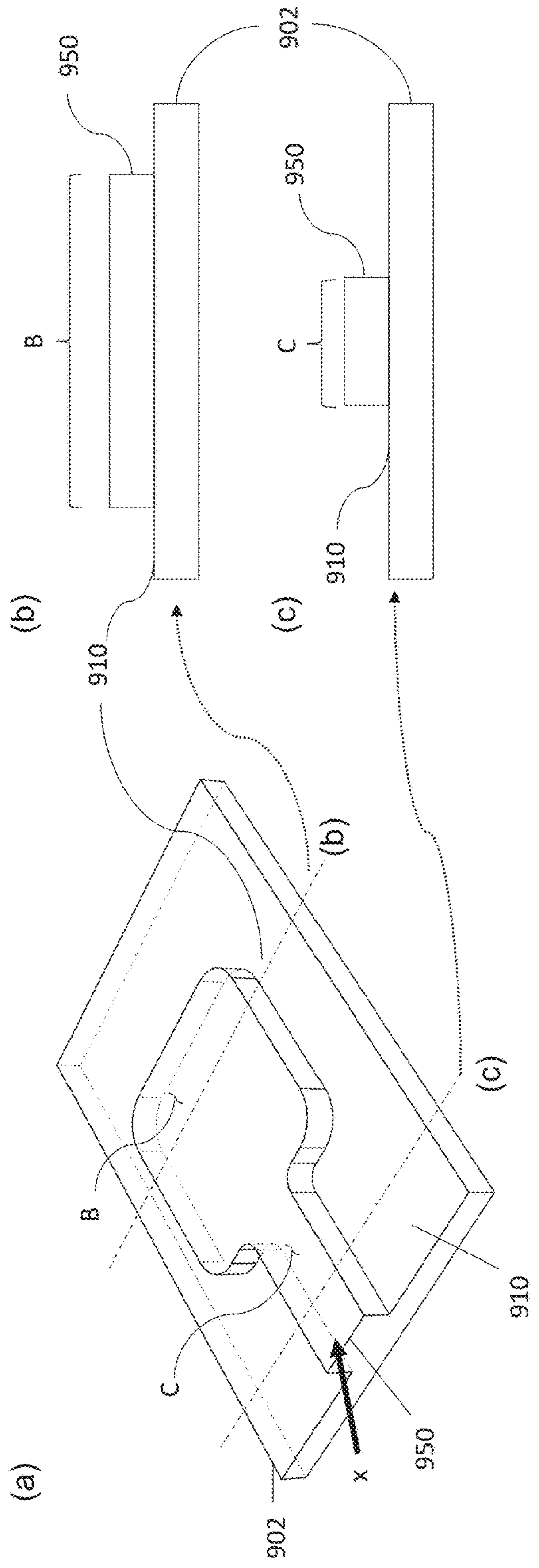
FIG. 9 shows an example of another exemplary P-CARD device having the raised pedestal structure and surface (950) in perspective (a) and cross section (b) views.

FIG. 9 shows the base portion of an exemplary P-CARD device having a base plate (902) having a shaped pedestal (950) and well region (910). Base plate walls surrounding the pedestal and the well areas are not shown. Section (b) has a wide pedestal region (B).

Section (c) has a narrow"r "nec" ed" pedestal area (C) near the exterior sample deposition and contact are " "" x") for receiving and guiding the liquid sample to the larger or wider pedestal area (B) in the interior. Optional spacers are not shown.

Figure 10:
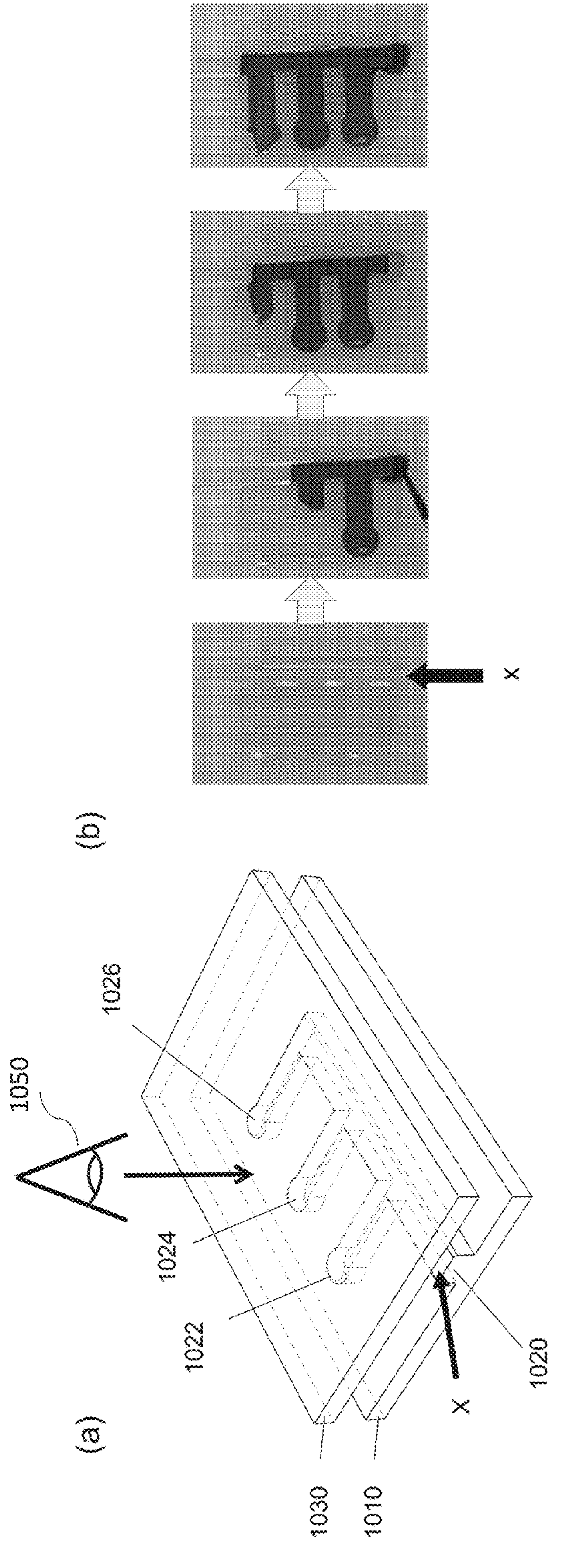
FIG. 10 shows an example of an actual pedestal device in a perspective line drawing (a) and a series of images (b) showing selective blood sample migration on and into the pedestal regions from the exterior liquid sample contact area (x).

FIG. 10 shows an example of an actual pedestal device in a perspective line drawing (a) and a series of images (b) of an actual pedestal device showing selective blood sample migration on and into the pedestal regions. Base plate walls surrounding the pedestal and the well areas are not shown.

FIG. 10 shows a schematic in perspective in (a) of an example of an exemplary device having a base plate (1010) with a shaped pedestal (1020). The device has three pedestal regions or branches (1022, 1024, 1026) branched-off the sample introduction por ("x") and lead-in pedestal path (1020). The branched pedestal regions (1022, 1024, 1026) fill the first pedestal branch (1022) region closest-to the sample introduction port with migrating sample before completely filling-up the second branch, and likewise for the third branch.

FIG. 10 in (b) shows a series of overhead images in plan view (i.e., as seen by an imager or viewer (1050) in (a)) of an actual example experiment that demonstrates a blood sample flowing laterally into the device on a level surface. The flowing blood sample is guided by the pedestal structure (1020) on the base plate (1010) into each of the branches of the pedestal. The device shown in the images has a single 1 mm thick base plate (1010) (e.g., acrylic) with three pedestal branches, a single 175 μm thick cover plate (1030) (e.g., acrylic) having a plurality of spacers (not shown in (a);

present but not visible in (b)), i.e., a periodic pillar array attached to the cover plate. The spacers in the pillar array have a pillar height of 30 μm. The device shown in the images has "a "dead" nd", i.e., end-of-the-line pedestal surface after the three branches. In an embodiment, t"e "dead" nd" path after the three branches can instead be "a "live" nd" that can serve as a vent, an expansion area, or a liquid overflow path into a well or out of the plate cavity. Notably, the device shown in the images imbibes the entire blood sample through the sample port (x) and fills the three branched pedestal area without any significant leakage down into the surrounding well areas, for example, when the sample volume is smaller than the cavity volume associated with the pedestal area.

Figure 11:
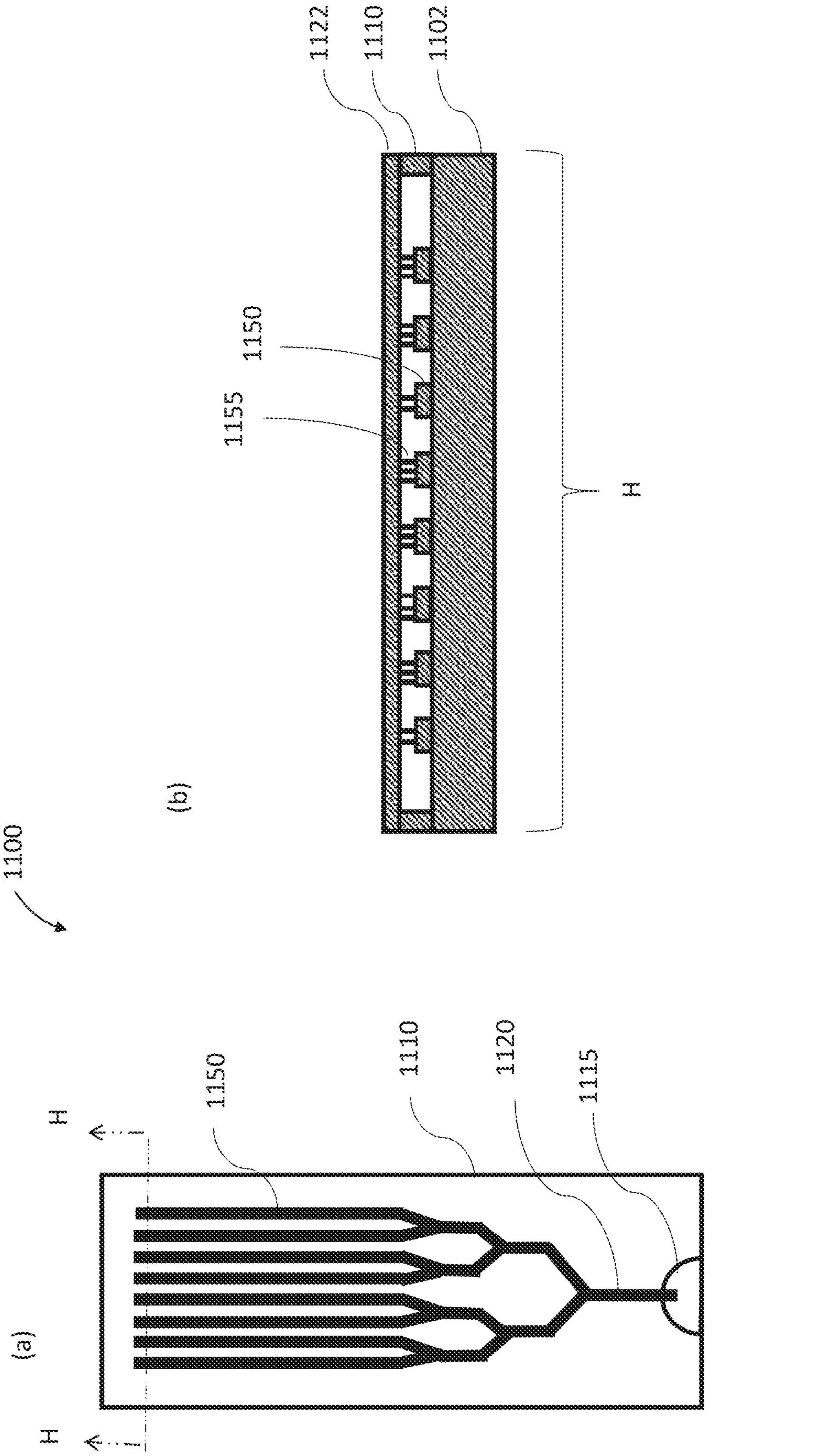
FIG. 11 shows an example of another pedestal device in a plan view line drawing (a) and in cross section (b) showing multiple branching of the pedestal structure and the pedestal surface from the exterior liquid sample contact area.

FIG. 11 shows an example of another pedestal device in a plan view line drawing (a) and in cross section (b) showing multiple branching of the pedestal structure and the pedestal surface from the exterior liquid sample contact area. The pedestal device (1100) has a walled perimeter (1110), an exterior liquid sample contact area (1115), a necked pedestal region (1120) connecting to a plurality of pedestal branched paths (1115). Section (H) in (a) is shown in cross section in (b). A sample such as blood is present in (a) atop the wall-less pedestal branch surfaces, and the sample is absent in (b) for clarity. The cross section (H) in (b) also shows the pedestal device (1100) having a base plate (1102), a walled perimeter (1110), a cover plate (1122), a plurality (8) of pedestal branches (1150), and a plurality of optional spacers (1155).

In one embodiment, there is at least one branch region closest-to the sample introduction port.

In one embodiment, there are several branch regions closest-to the sample introduction port.

In one embodiment, there is at least one branch connected to the branch region closest-to the sample introduction port.

In one embodiment, there are two, three, four, five, six, seven and more branches connected to the branch region closest-to the sample introduction port.

Figure 12:
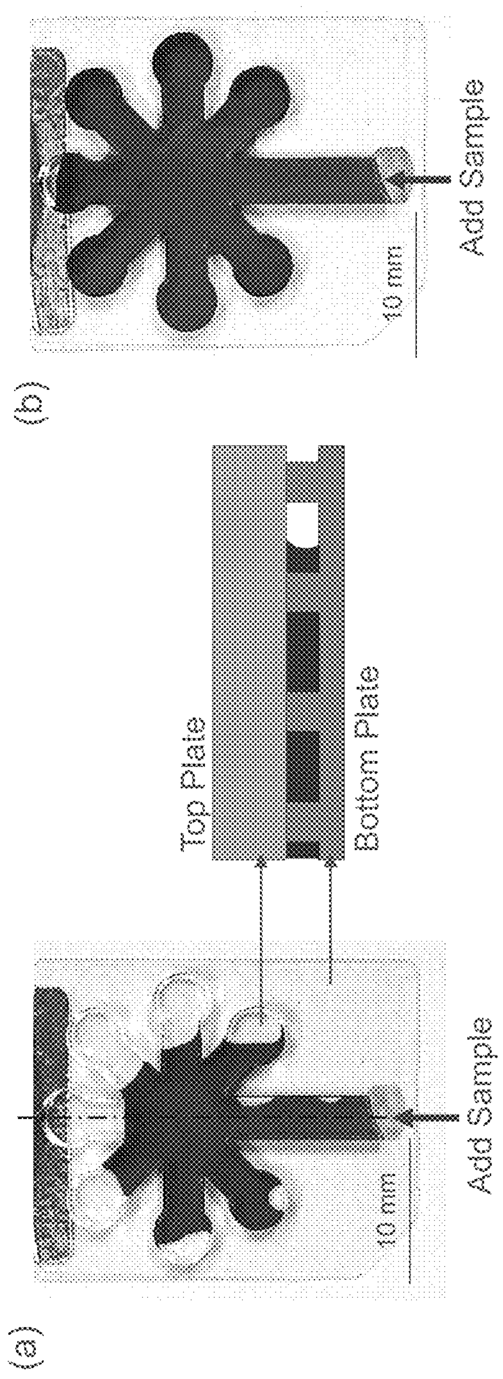
FIG. 12 shows one example of the device sucking in the blood sample and automatically distributing the blood into seven branches. The device has a top plate (1 mm thick poly(methyl methacrylate) (PMMA)) and a bottom plate (175 μm thick PMMA with a pillar array of 30 μm pillar heights) pressed together. The blood is added from the bottom inlet shown in the figures, wherein (a) 10 μL whole blood sample added and (b) 15 μL whole blood sample added. After blood reaching each branch, different assay can be performed locally and separately.

FIG. 12 shows an example of an actual device sucking in the blood sample and automatically distributing the blood into seven branches. The device has a top plate (1 mm thick PMMA) and a bottom plate (175 μm thick PMMA with a pillar array of 30 μm pillar heights) pressed together. The blood is added from the bottom inlet shown in the figures, wherein (a) 10 μL whole blood sample added and (b) 15 μL whole blood sample added. After blood reaches each branch, different assay can be performed locally and separately.

This device has seven pedestal regions or branches branched-off the sample introduction port ("x") and lead-in pedestal path. The branched pedestal regions fill the first pedestal branch region closest-to the sample introduction port with migrating sample before completely filling-up the other branches. The flowing blood sample is guided by the pedestal structure on the base plate into each of the branches of the pedestal.

The device shown in the images has a single 1 mm thick base plate (e.g., acrylic) with seven pedestal branches, a single 175 μm thick cover plate (e.g., acrylic) having a plurality of spacers (not shown in (a); present but not visible in (b)), i.e., a periodic pillar array attached to the cover plate. The spacers in the pillar array have a pillar height of 30 μm. Notably, the device shown in the images imbibes the entire blood sample through the sample port (x) and fills the seven branched pedestal area without any significant leakage down into the surrounding well areas, for example, when the sample volume is smaller than the cavity volume associated with the pedestal area as shown in (a) 10 μL whole blood sample added and (b) 15 μL whole blood sample added.

In some embodiments, one lateral dimension of the pedestal structure can be, for example, 1 μm, 25 μm, 50 μm, 100 μm, 200 μm, 500 μm, 1 mm, 2 mm, 3 mm, 5 mm, 1 mm, 10 mm, or in a range between any of the two values.

In some embodiments, one vertical dimension of the pedestal structure rising above the surface of the well region can be, for example, 50 μm, 100 μm, 200 μm, 500 μm, 800 μm, 1 mm, 10 mm, 50 mm, or in a range between any of the two values.

The combination of the pedestal area, opposing cover plate, and the optional pillars provides capillary action to migrate the sample and distribute the sample over the pedestal sample region.

The working principle of the device is based on capillary action (sometimes capillarity, capillary motion, capillary effect, or wicking), which is the ability of a liquid to flow in narrow spaces without the assistance of, or even in opposition to, external forces like gravity. In this device, the capillary force restricts and guides the liquid above the pedestal due to narrower spacing compared with recessed area surrounding it. The capillary force is also influenced by the liquid property and surface property. Thus, by engineering the structure, coating, and liquid composition, the liquid sample control is achieved in this device.

In some embodiments, the pedestal surface can have a coating on the top surface of the pedestal.

In some embodiments, the pedestal surface can have a hydrophobic coating, hydrophilic coating, or both hydrophobic and hydrophilic coatings.

In some embodiment, a coating is on at least one interior opposing surface of at least one of the plates, or both. The coating uses hydrophilic treatment, including but not limit to dielectric material coating, silicon oxide coating, plasma treatment, ozone treatment, polymer coating, acid-base treatment, surfactant chemical coating.

In some embodiments, the wetting angle at one interior surface is 10°, 20°, 30°, 45°, 60°, 75° or in a range between any of these values.

In some embodiments, the pedestal surface coating can include a hydrophobic coating.

In some embodiments, the pedestal surface coating can include a hydrophilic coating.

In some embodiments, the pedestal surface coating can include an ionic, a non-ionic, or both ionic and non-ionic coatings.

In some embodiments, the pedestal surface coating can include, for example, at least one of trichloro (1H, 1H, 2H, 2H-perfluorooctyl) silane, alkanes, oils, fats, greasy substances, or combinations thereof.

In some embodiments, the disclosure provides a method for separating a liquid in the device, comprising:

(a) obtaining a liquid sample;
(b) obtaining a device in above disclosure;
(c) depositing the sample on one or both of the plates when the plates are configured in the open configuration,
(d) after (c), forcing the two plates into a closed configuration; and the liquid is separated into parts by separation structure or coating in the device.

In some embodiments, the disclosure provides a method for separating liquid in the device, comprising:

(a) obtaining a liquid sample;
(b) obtaining a device in above disclosure in closed configuration;
(c) depositing the sample on side the plates, (d) after (c), the liquid is sucked into the device and separated into parts by separation structure or coating in the device.

In an embodiment, the separation structure is combined with a separation coating on the surface of the device. For example, a separation trench can be further treated into hydrophobic surface inside the trench.

Each of the individual embodiments described and illustrated herein has discrete components and features which can be readily separated from or combined with the features of any of the other several embodiments without departing from the present teachings. Any recited method can be carried out in the order of events recited or in any other order which is logically possible. A skilled artisan will appreciate that the present invention is not limited in its application to the details of construction, the arrangements of components, category selections, weightings, pre-determined signal limits, or the steps set forth in the description or drawings.

A method of performing biological and chemical assays using the device, comprising the steps of:

(a) obtaining a device of the embodiment;

(b) dropping the sample onto the exterior liquid sample contact area;

(c) the sample is guided flow into the device and on top of the pedestal area and into the imaging area;

(d) imaging and analyzing the sample in the imaging area

In one embodiment, the signal measured in imaging area is cell or particle numbers.

In one embodiment, the signal measured in imaging area is colorimetric intensity.

In one embodiment, the signal measured in imaging area is transmitted light intensity.

In one embodiment, the signal measured in imaging area is fluorescence signal intensity.

In one embodiment, the signal measured in imaging area is transmittance and/or absorptance.

In one embodiment, the parameters measured in imaging area is complete blood count including but not limit to white blood cell count, red blood cell count, platelet count, white blood cell differentiation and count e.g., neutrophils, lymphocytes, monocytes, eosinophils and basophils—as well as abnormal cell types if they are present.

The device of any prior device claim, wherein one of the plates is fabricated by imprint lithography.

The device of any prior device claim, wherein one of the plates is fabricated by injection molding.

The device is fabricated with materials of polystyrene, PMMA, polycarbonate (PC), cyclic olefin copolymer (COC), cyclic olefin polymer (COP), or another plastic.

One of the plates has a thickness of 200 μm to 1500 μm.

One of the plates has a thickness of 50 μm to 250 μm.

The assay performed locally at each branch includes but not limited to colorimetric assay, immunoassay, cell counting, cell staining, and others.

In some embodiments, different assays are performed on different branches of the device.

In some embodiments, the distance between each branch is 0.5 mm, 1 mm, 2 mm, 5 mm, 10 mm, or in a range between any of these values.

In some embodiments, the shape of each branch is selected from line, round, polygonal, circular, square, rectangular, oval, elliptical, or any combination of the same.

In some embodiments, the period of spacer on the plate is 10 μm, 20 μm, 30 μm, 50 μm, 100 μm, 150 μm, 200 μm, 300 μm, or in a range between any of these values.

In some embodiments, the size of spacer on the plate is 5 μm, 10 μm, 20 μm, 30 μm, 50 μm, 100 μm, or in a range between any of these values.

QMAX System

1. QMAX Card (Q-CARD)

Details of the QMAX (Q: quantification; M: magnifying; A: adding reagents; X: acceleration) card are described in detail in a variety of publications including the abovementioned PCT/US2016/046437, which is entirely incorporated here by reference.

I. Plates

In present invention, generally, the plates of CROF are made of any material that (i) is capable of being used to regulate, together with the spacers, the thickness of a portion or entire volume of the sample, and (ii) has no significant adverse effects to a sample, an assay, or a goal that the plates intend to accomplish. However, in certain embodiments, particular materials and their properties are selected for the plate to achieve certain objectives.

In certain embodiments, the two plates can have the same or different parameters for each of the following plate parameters: construction material, thickness, shape, area, flexibility, surface property, and optical transparency.

(i) Plate Materials. The plates can be made of, for example, a single material, composite materials, multiple materials, multi-layers of materials, alloys, or a combination thereof. Each of the materials for the plate can be, for example, an inorganic material, an organic material, or a mixture thereof. The plate material(s) is preferably compatible with other structural materials or assay materials such as a plate coating, a sample, a liquid, a diluent, a solvent, an analyte, and like substances. A significant physical property of the selected construction material for the plate having spacers is flowability under heat, pressure, or both. Examples of flowable materials include: inorganic materials such glass, quartz, oxides, silicon-dioxide, silicon-nitride, hafnium oxide (HfO), aluminum oxide (AlO), semiconductors (e.g., silicon, GaAs, GaN), metals (e.g., gold, silver, coper, aluminum, Ti, Ni), ceramics, or any flowable combination thereof, organic materials such as polymers (e.g., plastics) or amorphous organic materials. The polymers can include, for example, an acrylate, vinyl, olefin, cellulosic, non-cellulosic, polyester, polyamide (PA) (e.g., Nylon), cyclic olefin copolymer (COC), poly(methyl methacrylate) (PMMA), polycarbonate (PC), cyclic olefin polymer (COP), liquid crystalline polymer (LCP), polyethylene (PE), polyimide (PI), polypropylene (PP), poly(phenylene ether) (PPE), polystyrene (PS), polyoxymethylene (POM), polyether ether ketone (PEEK), polyether sulfone (PES), poly(ethylene phthalate) (PET), polytetrafluoroethylene (PTFE), polyvinyl chloride (PVC), polyvinylidene fluoride (PVDF), polybutylene terephthalate (PBT), fluorinated ethylene propylene (FEP), perfluoroalkoxyalkane (PFA), polydimethylsiloxane (PDMS), natural or synthetic rubber, or a combination thereof, or a compatible mixture of inorganic and organic materials.

In certain embodiments, the plates are each independently made of at least one of glass, plastic, ceramic, or metal. In certain embodiments, each plate independently includes at least one of glass, plastic, ceramic, or metal. In certain embodiments, one plate can be different from the other plate in, for example, lateral area, thickness, shape, materials, or surface treatment. In certain embodiments, one plate can be the same as the other plate in lateral area, thickness, shape, construction materials, or surface treatment.

The materials for the plates can be rigid, flexible, or any flexibility between the two. The rigidity (i.e., stiffness) or flexibility is relative to a given pressing force used in bringing the plates into a closed configuration.

In certain embodiments, a selection of rigid or flexible plate can be determined from the requirements of controlling a uniformity of the sample thickness in a closed configuration.

In certain embodiments, at least one of the two plates can be transparent (e.g., to a light). In certain embodiments at least, a part or several parts of one plate or both plates can be transparent. In certain embodiments, the plates can be non-transparent or opaque.

(ii) Plate Thickness. In certain embodiments, the average thicknesses for at least one of the pates can be, for example, 2 nm or less, 10 nm or less, 100 nm or less, 500 nm or less, 1000 nm or less, 2 μm (micron) or less, 5 μm or less, 10 μm or less, 20 μm or less, 50 μm or less, 100 μm or less, 150 μm or less, 200 μm or less, 300 μm or less, 500 μm or less, 800 μm or less, 1 mm (millimeter) or less, 2 mm or less, 3 mm or less, including intermediate values or ranges.

In certain embodiments, the average thickness for at least one of the plates is at most 3 mm (millimeter), at most 5 mm, at most 10 mm, at most 20 mm, at most 50 mm, at most 100 mm, at most 500 mm, including intermediate values or ranges.

In certain embodiments, the thickness of a plate is not uniform across the plate. Using a different plate thickness at a different location can be used to control the plate bending, folding, sample thickness regulation, and other characteristics.

(iii) Plate Shape and Area. Generally, the plates can have any shapes, as long as the shape allows for a compressed open flow of the sample and the regulation of the sample thickness (i.e., CROF). However, in certain embodiments, a particular shape can be advantageous. The shape of the plate can be, for example, round, square, elliptical, a rectangle, a triangle, a polygon, ring-shaped, or any superpositions of these shapes.

In certain embodiments, the two plates can have the same size or shape, or a different size or shape. The area of the plates can depend on the application. The area of the plate, on one side or both, can be, for example, 1 $mm^2$ (square millimeters), 10 $mm^2$, 100 $mm^2$, 1 $cm^2$ (square centimeters), 5 $cm^2$, 10 $cm^2$, 100 $cm^2$, 500 $cm^2$, 1000 $cm^2$, 5000 $cm^2$, 10,000 $cm^2$, or over 10,000 $cm^2$, including intermediate values or ranges.

In certain embodiments, at least one of the plates can be, for example, a belt (or strip) that has a width, thickness, and length. The width can be, for example, 0.1 cm (centimeter), 0.5 cm, 1 cm, 5 cm, 10 cm, 50 cm, 100 cm, 500 cm, 1000 cm, including intermediate values or ranges. The length can be as long as needed. The belt can be rolled into a roll.

(iv) Plate Surface Flatness. In many embodiments, an opposable inner surface of the plates can be, for example, flat or significantly flat, i.e., planar. In certain embodiments, the two opposable inner plate surfaces, in a closed configuration, can be, for example, parallel with each other. Flat inner surfaces facilitate quantification, controlling of the sample thickness, or both, by simply using the predetermined spacer height in the closed configuration. For non-flat inner surfaces of the plate, one needs to know not only the spacer height, but also the exact topology of the inner surface to quantify, to control the sample thickness, or both, in the closed configuration. To know the surface topology one needs additional measurements, corrections, or both, which can be complex, time consuming, and costly.

A flatness of the plate surface relative to the final thickness (i.e., the sample thickness in a two-plate closed configuration), can be characterized by the term "relative surface flatness," which is the ratio of the plate surface flatness variation to the final sample thickness.

In certain embodiments, the relative surface flatness, can be, for example, less than 0.01%, 0.1%, less than 0.5%, less than 1%, less than 2%, less than 5%, less than 10%, less than 20%, less than 30%, less than 50%, less than 70%, less than 80%, less than 100%, including intermediate values or ranges.

(v) Plate Surface Parallelism. In certain embodiments, the two opposable surfaces of a plate can be substantially parallel to each other. In certain embodiments, the two opposable surfaces of the plate are not parallel to each other.

(vi) Plate Flexibility. In certain embodiments, a plate can be flexible under compression of a CROF process. In certain embodiments, both plates are flexible under compression of a CROF process. In certain embodiments, one plate is rigid and another plate is flexible (i.e., bendable without breaking), resilient (i.e., capable of recoiling or springing back into an original shape after applying, e.g., a bending, stretching, or compressing force), or both, under the compression force of a plate member in a CROF process. In certain embodiments, both plates can be rigid. In certain embodiments, both plates can be flexible, resilient, or both, but can have different degrees of flexibility or resiliency.

(vii) Plate Optical Transparency. In certain embodiments, a plate can be optically transparent. In certain embodiments, both plates can be optically transparent. In certain embodiments, one plate can be optically transparent and another plate can be optically opaque. In certain embodiments, both plates can be opaque. In certain embodiments, both plates can be optically transparent but can have different degrees of optical transparency. The optical transparency of a plate refers to a portion or the entire area of the plate.

(viii) Surface Wetting Properties. In certain embodiments, a plate can have an inner surface that wets (i.e., contact angle is less 90 degree) with application of the sample, the transfer liquid, or both. In certain embodiments, both plates can have an inner surface that wets with application of the sample, the transfer liquid, or both; either sample or liquid having the same or different wettability. In certain embodiments, a plate can have an inner surface that wets with application of the sample, the transfer liquid, or both; and another plate has an inner surface that does not wet (e.g., the contact angle equal to or larger than 90 degree). The wetting of a plate inner surface can refer to a portion or the entire inner surface area of the plate.

In certain embodiments, the inner surface of the plate can have other nano- or microstructures to control a lateral flow of a sample during a CROF process. The nano- or microstructures can include, for example, channels, vias, bumps, and like structures. Nano- and microstructures can also be used to control the wetting properties of an inner surface.

II. Spacers (i) Spacer Function. The spacers can be configured to have one or any combination of the following functions and properties: (1) control, together with the plates, the thickness of the sample or a relevant volume of the sample (preferably, the thickness control is precise, uniform, or both, over a relevant area); (2) allow the sample to have a compressed regulated open-flow ("CROF") on plate surface; (3) not occupy significant surface area (volume) in a given sample area (volume); (4) reduce or increase the effect of sedimentation of particles or analytes in the sample; (5) change, control, or both, the wetting properties of the inner surface of the plates; (6) identify a location of the plate, a scale of size, information related to a plate, or a combination thereof, or (7) any combination of the above.

(ii) Spacer Architectures and Shapes. To achieve desired sample thickness reduction and control, in certain embodiments, the spacers can be fixed to their respective plate. In general, the spacer can have any shape, as long as the spacers are capable of regulating the sample thickness during a CROF process, but certain shapes are preferred to achieve certain functions, such as better uniformity, less overshoot in pressing, and like considerations.

The spacer(s) can be a single spacer or a plurality of spacers (e.g., an array). Certain embodiments of a plurality of spacers can have, for example, an array of spacers (e.g., pillars), where the inter-spacer distance (ISD) is periodic or aperiodic, or is periodic or aperiodic in certain areas of the plates, or has different distances in different areas of the plates.

In an embodiment, there can be two kinds of the spacers: open-spacers and enclosed-spacers. The open-spacer is the spacer that allows a sample to flow through the spacer (i.e., the sample flows around and past the spacer, for example, a post as the spacer. The enclosed spacer is the spacer that stops sample flow (i.e., the sample cannot flow beyond the spacer), for example, a ring-shaped spacer and a sample is inside the ring. Both types of spacers can use their height to regulate the final sample thickness at a closed configuration.

In certain embodiments, the spacers can be, for example: open-spacers only; enclosed-spacers only; or a combination of open-spacers and enclosed-spacers.

"Pillar spacer" refers to a spacer having a pillar shape and the pillar shape can refer to an object that has a height and a lateral shape that allows a sample to flow around it during a compressed open flow.

In certain embodiments, the lateral shapes (i.e., the cross sectional geometry in a plane parallel to a plate) of the pillar spacers can be selected from the groups: (i) round, elliptical, rectangular, triangular, polygonal, ring-shaped, star-shaped, letter-shaped (e.g., L-shaped, C-shaped, and like letter shapes from A to Z), or number shaped (e.g., shapes such as 0 1, 2, 3, 4 . . . . to 9); (ii) a shape having at least one rounded corner; (iii) a shape having zig-zag or rough edges; or (iv) any superposition or combination of shapes (i) to (iii). For multiple spacers, different spacers can have different lateral shapes and sizes, and different distances from the neighboring spacers.

In certain embodiments, the spacer structure can include, for example, a post, a column, a bead, a sphere, or other suitable geometries that can be formed in an imprinting mold process. The lateral shape and dimension (i.e., perpendicular or normal to the respective plate surface) of the spacers can be anything, except, in certain embodiments, the following restrictions can apply: (i) the spacer geometry does not cause a significant error in measuring the sample thickness and volume; or (ii) the spacer geometry does not prevent the out-flowing of the sample between the plates (i.e., the plate is not in an enclosed form). In certain embodiments, the plate can have, for example, some spacers that are closed spacers that can restrict sample flow.

In certain embodiments, the shapes of the spacers have rounded corners. For example, a rectangle shaped spacer has one, several, or all corners rounded (e.g., resembling a circle rather than 90° angles). A round corner can often make a fabrication of the spacer easier, and in some instances cause less damage to a biological sample or specimen when in use.

The sidewall of the pillars can be, for example, straight, curved, sloped, or have a different shape in different sections of a selected sidewall. In certain embodiments, the spacers can be, for example, pillars of various lateral shapes, sidewalls, and pillar-height to pillar-lateral area ratio. In a preferred embodiment, the spacers can have pillar shapes the permit open-flow of the sample such as in a CROF process.

(iii) Spacer Material. The spacers can be made of any material that is capable of being used to regulate, together with the two plates, the thickness of a relevant volume of the sample. In certain embodiments, the spacer material can be different from plate material. In certain embodiments, some spacer material can be the same as a portion of the material for at least one plate.

The spacers can be made of, for example, a single material, composite materials, multiple materials, multiple layers of a material, an alloy, or a combination thereof. Each of the materials for the spacer can be, for example, an inorganic material, an organic material, or a mixture thereof. Examples of the spacer materials are mentioned above. In a preferred embodiment, the spacers can be made of, for example, the same material as a plate used in a CROF process.

(iv) Spacer Mechanical Strength and Flexibility. In certain embodiments, the mechanical strength of the spacers can be strong enough, so that during the compression and in the closed configuration of the plates, the height of the spacers is the same or substantially the same as that when the plates are in an open configuration. In certain embodiments, the differences of the spacers in the open configuration and in the closed configuration can be characterized and established in advance.

The material for the spacers can be, for example, rigid, flexible, or any flexibility between the two. A rigid spacer is relative to a given pressing force used to bring the plates into the closed configuration. If the spacer does not deform greater than 1% in its height under the pressing force, the spacer material can be regarded as rigid, otherwise a flexible.

When a spacer is made of flexible material, the final sample thickness at a closed configuration can still be established in advance from the pressing force and the mechanical property of the spacer. The material for the spacers can be selected to be resilient, i.e., flexible and also capable of substantially rebounding to an original shape when the pressing force is removed.

(v) Spacers Inside the Sample Area. To achieve desired sample thickness reduction and control, particularly to achieve a good sample thickness uniformity, in certain embodiments, the spacers can be placed, i.e., located, inside the sample area, or the relevant volume of the sample. In certain embodiments, there can be one or more spacers inside the sample area or the relevant volume of the sample on the plate or plate combination, and having a proper inter-spacer distance. In certain embodiments, at least one of the spacers can be inside the sample area, at least two of the spacers can be inside the sample area or the relevant volume of the sample, or at least "n" spacers inside the sample area or the relevant volume of the sample, where "n" can be determined by a sample thickness uniformity, or a required sample flow property during a CROF process.

(vi) Spacer Height. In certain embodiments, all spacers can have the same pre-determined height. In certain embodiments, spacers can have a different pre-determined height. In certain embodiments, spacers can be divided into groups or regions, wherein each group or region has its own spacer height. In certain embodiments, the predetermined height of the spacers can have an average height of the spacers. In certain embodiments, the spacers can have approximately the same height. In certain embodiments, a percentage of a number of the spacers can have the same height.

The height of the spacers can be selected by a desired regulated final sample thickness and the residue sample thickness. The spacer height (e.g., the predetermined spacer height) or the sample thickness can be, for example, 1 nm, 3 nm, 10 nm, 50 nm, 100 nm, 200 nm, 500 nm, 800 nm, 1000 nm, 1 μm, 2 μm, 3 μm, 5 μm, 10 μm, 20 μm, 30 μm, 50 μm, 100 μm, 150 μm, 200 μm, 300 μm, 500 μm, 800 μm, 1 mm, 2 mm, 4 mm, including any intermediate values or ranges.

The spacer height, sample thickness, or both, can be, for example, 1 nm to 100 nm in one preferred embodiment, 100 to 500 nm in another preferred embodiment, 500 to 1000 nm in a separate preferred embodiment, 1 (i.e., 1000 nm) to 2 μm in another preferred embodiment, 2 to 3 μm in a separate preferred embodiment, 3 to 5 μm in another preferred embodiment, 5 to 10 μm in a separate preferred embodiment, 10 to 50 μm in another preferred embodiment, and 50 to 100 μm in a separate preferred embodiment. The height or thickness preferences can be selected or applicable based on, for example, the expected dimensions of the analyte(s) in a sample, such as whole blood components, microorganisms, or environmental pollution particles.

In certain embodiments, the spacer height, the deposited sample thickness, or both, can be, for example: (i) equal to or slightly larger than the minimum dimension of an analyte; or (ii) equal to or slightly larger than the maximum dimension of an analyte. The "slightly larger" means that the spacer height, the sample thickness, or both, can be, for example, about 1 to 5% larger, including any intermediate values or ranges.

In certain embodiments, the spacer height, the sample thickness, or both, can be larger than the minimum dimension of an analyte, but less than the maximum dimension of the analyte (i.e., an analyte can have an anisotropic shape or aspect ratio). For example, a red blood cell has a disk shape with a minimum dimension of 2 μm (disk thickness) and a maximum dimension of 11 μm (disk diameter). The spacers can be selected to make the inner surface spacing of the plates (i.e., separation between the inner surfaces of the plates) in a relevant area to be 2 μm (i.e., equal to the minimum dimension) in one embodiment, 2.2 um in another embodiment, or 3 (50% larger than the minimum dimension) in yet another embodiment, but less than the maximum dimension of the red blood cell. Such embodiment has certain advantages in blood cell counting. In one embodiment, for red blood cell counting, by making the inner surface spacing at 2 or 3 μm, and any number between the two values, an undiluted whole blood sample can be confined in the spacing, on average, and each individual red blood cell (RBC) does not overlap with other RBCs, allowing an accurate counting of the RBCs visually or optically. Too many overlaps between the RBCs can cause serious errors in counting.

In certain embodiments, a card device uses the plates and the spacers to regulate not only the thickness of a sample, but also the orientation, surface density, or both, of the analytes or entity in the sample when the plates are in the closed configuration. When the plates are in a closed configuration, a thinner thickness of the sample gives fewer analytes or entities per surface area (i.e., less surface area concentration).

(vii) Spacer Lateral Dimension. For an open-spacer, the lateral dimensions can be characterized by spacer lateral dimension (alternatively called "width") in the x and y orthogonal directions. The lateral dimension of a spacer in each direction (x or y) can be the same or different.

In certain embodiments, the ratio of the lateral dimensions of the x to y direction can be, for example, 1, 1.5, 2, 5, 10, 100, 500, 1000, 10,000, including intermediate values or ranges. In certain embodiments, a different ratio can be used to regulate the sample flow direction; the larger the ratio, the flow is along one direction (i.e., a larger size direction).

In certain embodiments, the different lateral dimensions of the spacers in the x and y direction can be used for (a) using the spacers as scale-markers to indicate the orientation of the plates, (b) using the spacers to create more sample flow in a preferred direction, or both.

In certain embodiments, all spacers can have the same shape and dimensions. In certain embodiments, each of the spacers can have different lateral dimensions.

In certain embodiments, for enclosing-spacers or enclosed-spacers, the inner lateral shape and size can be selected based on the total volume of a sample to be enclosed by the enclosed spacer(s), where the volume size has been described above. In certain embodiments, the outer lateral shape and size can be selected based on the strength needed to support the pressure of the liquid against the spacer and the compress pressure that presses the plates.

(viii) Aspect Ratio of Height to the Average Lateral Dimension of Pillar Spacer. In certain embodiments, the aspect ratio of the height to the average lateral dimension of the pillar spacer can be, for example, 100,000, 10,000, 1,000, 100, 10, 1, 0.1, 0.01, 0.001, 0.0001, 0, 0.00001, including intermediate values or ranges.

(ix) Spacer Height Precision. In preferred embodiments, the spacer height should be controlled precisely. The relative precision of the spacer (i.e., the ratio of the deviation to the desired spacer height) can be, for example, 0.001% or less, 0.01%, 0.1%; 0.5, 1%, 2%, 5%, 8%, 10%, 15%, 20%, 30%, 40%, 50%, 60%, 70%, 80%, 90%, 99.9%, including intermediate values or ranges.

(x) Inter-Spacer Distance. The spacers can be a single spacer or a plurality of spacers on the plate or in a relevant area of the sample. In certain embodiments, the spacers on the plates can be, for example, configured, arranged, or both, in an array form, and the array can be periodic, non-periodic, or a mixed array having periodic in some locations of the plate and non-periodic in other locations.

In certain embodiments, the periodic array of the spacers can have, for example, a lattice of square, rectangle, triangle, hexagon, polygon, or any combinations of thereof, where a combination means that different locations of a plate can have different spacer lattice geometries.

In certain embodiments, the inter-spacer distance of a spacer array can be periodic (i.e., having uniform inter-spacer distance) in at least one direction of the array. In certain embodiments, the inter-spacer distance can be configured to improve the uniformity between the plate spacing in a closed configuration.

The distance between neighboring spacers (i.e., the inter-spacer distance) can be, for example, 1 μm or less, 5 μm, 10 μm, 20 μm, 30 μm, 40 μm, 50 μm, 60 μm, 70 μm, 80 μm, 90 μm, 100 μm, 200 μm, 300 μm, 400 μm, including intermediate values or ranges.

In certain embodiments, the inter-spacer distance can be, for example, 400 μm or less, 500 μm, 1 mm, 2 mm, 3 mm, 5 mm, 7 mm, 10 mm, including intermediate values or ranges.

In certain embodiments, the inter-spacer distance can be, for example, 10 mm or less, 20 mm or less, 30 mm or less, 50 mm or less, 70 mm or less, 100 mm or less, including intermediate values or ranges.

The distance between neighboring spacers (i.e., the inter-spacer distance) can be selected so that for a given property of the plates and a sample, in the closed-configuration of the plates, the sample thickness variation between two neighboring spacers can be, in certain embodiments, at most 0.5%, 1%, 5%, 10%, 20%, 30%, 50%, 80%, including intermediate values or ranges; or in certain embodiments, at most 80%, 100%, 200%, 400%, including intermediate values or ranges.

To maintain a given sample thickness variation between two neighboring spacers, when a more flexible plate is used, a closer inter-spacer distance is needed.

In a preferred embodiment, the spacer can be a periodic square array, wherein the spacer can have a pillar that has a height of 2 to 4 μm, an average lateral dimension of from 5 to 20 μm, and an inter-spacer spacing of 1 μm to 100 μm.

In a preferred embodiment, the spacer can be a periodic square array, wherein the spacer can have a pillar that has a height of 2 to 4 μm, an average lateral dimension of from 5 to 20 μm, and an inter-spacer spacing of 100 to 250 μm.

In a preferred embodiment, the spacer is can be a periodic square array, wherein the spacer can have a pillar height of 4 to 50 μm, an average lateral dimension of from 5 to 20 μm, and an inter-spacer spacing of 1 μm to 100 μm.

In a preferred embodiment, the spacer can be a periodic square array, wherein the spacer can have a pillar height of 4 to 50 μm, an average lateral dimension of from 5 to 20 μm, and an inter-spacer spacing of 100 to 250 μm.

The period of the spacer array can be from 1 to 100 nm in one preferred embodiment, from 100 to 500 nm in another preferred embodiment, from 500 to 1000 nm in a separate preferred embodiment, from 1 (i.e., 1000 nm) to 2 μm in another preferred embodiment, from 2 to 3 μm in a separate preferred embodiment, from 3 to 5 μm in another preferred embodiment, from 5 to 10 μm in a separate preferred embodiment, from 10 to 50 μm in another preferred embodiment, from 50 to 100 μm in a separate preferred embodiment, from 100 to 175 μm in a separate preferred embodiment, and from 175 to 300 μm in a separate preferred embodiment.

(xi) Spacer Density. The spacers can be arranged on the respective plates at a surface density of greater than one per: 1 $\mu m^2$, 10 $\mu m^2$, 100 $\mu m^2$, 500 $\mu m^2$, 1000 $\mu m^2$, 5000 $\mu m^2$, 0.01 $mm^2$, 0.1 $mm^2$, 1 $mm^2$, 5 $mm^2$, 10 $mm^2$, 100 $mm^2$, 1000 $mm^2$, or 10,000 $mm^2$, including intermediate values or ranges.

In a preferred embodiment, the spacers can be configured to minimize or not occupy any significant surface area (volume) in a given sample area (volume).

(xii) Ratio of Spacer Volume to Sample Volume. In many embodiments, the ratio of the spacer volume (i.e., the volume occupied by the spacers in the sample area) to sample volume (i.e., the volume occupied by the sample in the sample area), or the ratio of the volume of the spacers that are inside of the relevant volume of the sample, can be controlled for achieving certain advantages. The advantages can include, for example, the uniformity of the sample thickness control, the uniformity of analytes, and the sample flow properties (i.e., flow speed, flow direction, and like advantages).

In certain embodiments, the ratio of the spacer volume to the sample volume, the ratio of the volume of the spacers that are inside of the relevant volume of the sample to the relevant volume of the sample, or both, can be, for example, is less than 100%, 99%, 70%, 50%, 30%, 10%, 5%, 3% 1%, 0.1%, 0.01%, or 0.001%, including intermediate values or ranges.

(xiii) Spacers Fixed to Plates. The inter-spacer distance and the orientation of the spacers have a significant role in the disclosed methods, and the distances and the orientations are preferably maintained during the process of bringing the plates from an open configuration to the closed configuration, are preferably predetermined before the process from an open configuration to a closed configuration, or both.

In certain embodiments, the spacers can be fixed on the surface of one of the plates before bringing the plates to the closed configuration. The term "a spacer is fixed with its respective plate" refers to a spacer that is attached to a plate and the attachment is maintained during a use of the plate. An example of "a spacer is fixed with its respective plate" is a spacer that is monolithically made of one piece of material of the plate, and the position of the spacer relative to the plate surface does not change. An example of "a spacer is not fixed with its respective plate" is a spacer that is glued to a plate by an adhesive, but during use of the plate, the adhesive cannot hold the spacer at its original location on the plate surface (i.e., the spacer moves away from its original position on the plate surface).

In certain embodiments, at least one of the spacers can be fixed to a plate or both plates. In certain embodiments, at least two spacers can be fixed to a plate or both plates. In certain embodiments, a majority of the spacers can be fixed to a plate or both plates. In certain embodiments, all of the spacers can be fixed to both of the respective plates.

In certain embodiments, a spacer can be fixed to a plate monolithically.

In certain embodiments, the spacers can be fixed to their respective plate by one or any combination of the following methods, configurations, or both: attached to, bonded to, fused to, imprinted, and etched.

In certain embodiments, the spacers and the plate can be made of the same materials.

In other embodiment, the spacers and the plate are made of different materials. In another embodiment, the spacer and the plate can be formed in one piece. In another embodiment, the spacer can have one end fixed to its respective plate, while the second end is open for accommodating different configurations of the two plates.

In other embodiment, each of the spacers independently can be at least one of: attached to; bonded to; fused to; imprinted-in or imprinted-on; or etched in the respective plate. "Independently" means that one spacer can be fixed to its respective plate by a same or a different method selected from: attached to; bonded to; fused to; imprinted in or -on; and etched in the respective plate.

In certain embodiments, at least a distance between two spacers can be predetermined. "Predetermined inter-spacer distance" means that the distance is known when a user uses the plates.

In certain embodiments of all methods and devices described herein, there can be additional spacers besides or in addition to the fixed spacers.

(xiv) Specific Sample Thickness. In the present invention, it was observed that a larger plate holding force (i.e., the force that holds the two plates together) can be achieved by using a smaller plate spacing (for a given sample area), or a larger sample area (for a given plate-spacing), or both.

In certain embodiments, at least one of the plates can be transparent in a region encompassing the relevant area, each plate has an inner surface configured to contact the sample in the closed configuration; the inner surfaces of the plates can be substantially parallel to each other, in the closed configuration; the inner surfaces of the plates can be substantially planar, except the locations that have the spacers; or any combination of thereof.

The spacers can be attached to a plate in a variety of ways, including, for example: lithography, etching, embossing (nanoimprint), depositions, lift-off, fusing, or a combination of thereof. In certain embodiments, the spacers can be directly embossed or imprinted on the plates. In certain embodiments, the spacers can be imprinted into a material (e.g., plastics) that is deposited on the plates. In certain embodiments, the spacers can be made by directly embossing a surface of a CROF plate. The nanoimprinting can be done by roll-to-roll technology using a roller imprinter, or roll to a planar nanoimprint. Such a process has a great economic advantage and lower costs.

In certain embodiments, the spacers can be deposited on the plates. The deposition can be, for example, evaporation, pasting, or a lift-off. In the pasting, the spacer can be fabricated first on a carrier, then the spacer can be transferred from the carrier to the plate. In the lift-off, a removable material can be first deposited on the plate and holes are created in the material; the hole bottom exposes the plate surface and then a spacer material can be deposited into the hole and afterwards the removable material can be removed, leaving only the spacers on the plate surface. In certain embodiments, the spacers deposited on the plate can be fused with the plate. In certain embodiments, the spacer and the plates can be fabricated in a single process. The single process includes imprinting (i.e., embossing, molding) or synthesis.

In certain embodiments, at least two of the spacers can be fixed to the respective plate by different fabrication methods, and optionally wherein the different fabrication methods include at least one of: depositing; bonding; fusing; imprinting; and etching.

In certain embodiments, one or more of the spacers can be fixed to the respective plate(s) by a fabrication method of being: bonded, fused, imprinted, or etched, or any combination thereof.

In certain embodiments, the fabrication methods for forming such monolithic spacers on the plate can include, for example, a method of being: bonded, fused, imprinted, etched, or any combination thereof.

Methods of Manufacture

Details of the method of manufacture of suitable card devices is disclosed, for example, in International Application No WO2019084513A1, which is incorporated by reference in its entirety.

To reduce non-specific adsorption of cells or compounds released by lysed cells onto the surfaces of the device, one or more surfaces of the device can be chemically modified to be non-adherent or repulsive. The surfaces can be coated with a thin film coating (e.g., a monolayer) of commercial non-stick reagents, such as those used to form hydrogels. Additional examples of chemical species that can be used to modify the surfaces of the device include, for example, an oligoethylene glycol, a fluorinated polymer, an organosilane, a fluorinated organosilane, a thiol, a poly-ethylene glycol, hyaluronic acid, bovine serum albumin, poly-vinyl alcohol, mucin, poly-HEMA, methacrylated PEG, and agarose. Charged polymers can also be employed to repel oppositely charged species. The type of chemical species used for repulsion and the method of attachment to the surfaces of the device can depend on the nature of the species being repelled and the nature of the surfaces and the species being attached. Such surface modification techniques are known in the art. The surfaces can be functionalized before or after the device is assembled. In some embodiments, one or more surfaces of the device can be coated or chemically modified with a capture agent to capture materials in the sample, e.g., membrane fragments or proteins.

In certain embodiments, a method for fabricating any Q-CARD of the disclosure can comprise injection molding of the first plate. In certain embodiments, a method for fabricating any Q-CARD of the disclosure can comprise nanoimprinting or extrusion printing of the second plate.

In certain embodiments, a method for fabricating any Q-CARD of the disclosure can comprise laser cutting the first plate. In certain embodiments, a method for fabricating any Q-CARD of the disclosure can comprise nanoimprinting or extrusion printing of the second plate. In certain embodiments, a method for fabricating any Q-CARD of the disclosure can comprise injection molding and laser cutting the first plate. In certain embodiments, a method for fabricating any Q-CARD of the disclosure can comprise nanoimprinting or extrusion printing of the second plate. In certain embodiments, a method for fabricating any Q-CARD of the disclosure can comprise nanoimprinting or extrusion printing to fabricate both the first and the second plate. In certain embodiments, a method for fabricating any Q-CARD of the disclosure can comprise fabricating the first plate or the second plate, using injection molding, laser cutting the first plate, nanoimprinting, extrusion printing, or a combination of thereof. In certain embodiments, a method for fabricating any Q-CARD of the disclosure can comprise a step of attaching the hinge on the first and the second plates after the fabrication of the first and second plates.

Other Embodiments

Further examples of inventive subject matter according to the present invention are described in the following paragraphs.

As used here and in the appended claims, the singular forms "a", "an", and "the" include plural referents unless the context clearly dictates otherwise, e.g., when the word "single" is used. For example, reference to "an analyte" can include a single analyte and multiple analytes, reference to "a capture agent" can include a single capture agent and multiple capture agents, reference to "a detection agent" can include a single detection agent and multiple detection agents, and reference to "an agent" can include a single agent and multiple agents.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" or "approximately" can mean within an acceptable error range for the particular value as determined by one of ordinary skill in the art, which will depend in part on how the value is measured or determined, i.e. the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term can mean within an order of magnitude, within 5-fold, and more preferably within 2-fold, of a value. Where particular values are described in the application and claims, unless otherwise stated the term "about" meaning within an acceptable error range for the particular value should be assumed. The term "about" has the meaning as commonly understood by one of ordinary skill in the art. In some embodiments, the term "about" refers to ±10%. In some embodiments, the term "about" refers to ±5%.

"Adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function. Similarly, subject matter that is recited as being configured to perform a particular function may additionally or alternatively be described as being operative to perform that function.

As used herein, the phrase, "for example," the phrase, "as an example," and/or simply the terms "example" and "exemplary" when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined.

The following Examples demonstrate the disclosed methods of making and using, and the article or the device in accordance with the above general procedures.

Example 1

Making a P-CARD

FIG. 12 shows an example of an actual P-CARD device with seven branches. The device has a top plate (1 mm thick PMMA) and a bottom plate (175 μm thick PMMA with a pillar array of 30 μm pillar heights) bonded together.

During the fabrication of such device, the top plate is laser cut into the pattern with seven branches and one inlet. The bottom plate is patterned with periodic pillar array with 30 μm pillar heights, 120 μm inter pillar distance and 30 μm to 40 μm pillar size on one of its surface. The pattern technology includes nanoimprint lithography.

Two plates are pressed firmly and bonded together at some edge point with UV curable glue. The pillar array on the bottom plate is facing up the top plate.

Example 2

Using a P-CARD

FIG. 12 shows an example of an actual device sucking in the blood sample and automatically distributing the blood into seven branches. The blood is added from the bottom inlet shown in the figures, wherein (a) 10 μL whole blood sample added and (b) 15 μL whole blood sample added. After blood reaches each branch, different assays can be performed locally and separately.

This device has seven pedestal regions or branches branched-off the sample introduction port ("x") and lead-in pedestal path. The branched pedestal regions fill the first pedestal branch region closest-to the sample introduction port with migrating sample before completely filling-up the other branches. The flowing blood sample is guided by the pedestal structure on the base plate into each of the branches of the pedestal.

The device shown in the images has a single 1 mm thick base plate (e.g., acrylic) with seven pedestal branches, a single 175 μm thick cover plate (e.g., acrylic) having a plurality of spacers (not shown in (a); present but not visible in (b)), i.e., a periodic pillar array attached to the cover plate. The spacers in the pillar array have a pillar height of 30 μm.

Notably, the device shown in the images imbibes the entire blood sample through the sample port (x) and fills the seven branched pedestal area without any significant leakage down into the surrounding well areas. The assay performed locally at each branch includes but not limited to colorimetric assay, immunoassay, cell counting, cell staining, and others. The present invention has been described with reference to various specific embodiments and techniques. However, many other variations and modifications are possible while remaining within the disclosed scope.

We claim:

1. A device for liquid sample collection and liquid sample analysis, comprising:

a base plate comprising a surface, wherein surface comprises at least one pedestal area in at least a portion of a sample image area and at least one recessed area, wherein at least a portion of the at least one pedestal area is adjacent to the at least one recessed area;

a cover plate that is moveable relative to the base plate to form different configurations including an open configuration and a closed configuration, wherein the cover plate comprises a surface that opposes the surface of the base plate and covers at least a portion of the pedestal area and at least a portion of the sample image area when the cover plate and the base plate are in the closed configuration;

a plurality of spacers attached to either the surface of the base plate or the surface of the cover plate, wherein the plurality of spacers are situated between the surface of the base plate and the surface of the cover plate in the closed configuration, wherein, in the closed configuration, the plurality of spacers regulate a gap between the surface of the pedestal area and the surface of the cover plate in the closed configuration, an exterior liquid sample contact area on an exterior location of the device, and the base plate and the cover plate define an interior cavity, wherein the interior cavity is in fluid communication with the exterior liquid sample contact area.

2. The device of claim 1, wherein the exterior liquid sample contact area is a sample entry orifice for receiving a liquid sample.

3. The device of claim 1, wherein the spacers are attached to at least one pedestal area of the base plate.

4. The device of claim 1, wherein the spacers are attached to at least one pedestal area of the base plate and to at least one recessed area of the base plate.

5. The device of claim 1, wherein the spacers are attached to the surface of the cover plate.

6. The device of claim 1, wherein the spacers are attached to the surface of the base plate.

7. The device of claim 1, wherein one or more of the spacers are attached to the surface of the cover plate, and one or more of the spacers are attached to the surface of the base plate.

8. The device of claim 1, wherein the spacers located in the pedestal area are shorter than the spacers located in the recessed area.

9. The device of claim 1, wherein the sample image area on the base plate has an area that fits within a field-of-view of a microscope imager.

10. The device of claim 1, wherein the at least one pedestal area comprises a plurality of branches, each branch having a reagent coated on a surface of the branch.

11. The device of claim 1, wherein the at least one pedestal area comprises: (a) a plurality of branches, each branch having a reagent coated on a surface of the branch; and (b) a lead-in pedestal path connecting a sample port with the plurality of branches.

12. The device of claim 1, wherein the at least one pedestal area comprises a plurality of branches, each branch having a different reagent coated on a surface of the branch;, wherein the different reagents are configured for different assay reactions selected from colorimetric assays, immunoassays, nucleic acid assays, cytology assays, cell lysis, staining, H&E staining, in-situ hybridization staining, immune staining, and combinations thereof.

13. The device of claim 1, wherein the at least one pedestal area comprises a plurality of branches, each branch having a reagent coated on a surface of the branch, wherein the reagent on each branch has a different label selected from fluorophores, electrochemiluminescent labels, chemiluminescent labels, color labels, nanoparticles, quantum dots, and combinations thereof.

14. The device of claim 1, wherein reagents coated on different pedestal branches differ from one another in assay reaction, concentration, label, or a combination of thereof.

15. The device of claim 1, wherein the base plate is attached to the cover plate by a fastener, a weld, an ultrasonic weld, an adhesive, or a combination thereof.

16. The device of claim 1, wherein the interior cavity comprises:

a horizontal channel having no vertical walls, wherein the horizontal channel is situated between the pedestal area and the cover plate, wherein the horizontal channel channels a liquid sample from the exterior liquid sample contact area on the exterior location of the device; and a chamber area having a ceiling, a floor, and walls, defined by the opposing plates, the at least one pedestal area, and the at least one recessed area.

17. The device of claim 1, wherein the cover plate is attached to the base plate, and the interior cavity is leak-resistant.

18. The device of claim 1, further comprising a vent from the interior cavity to the exterior of the device.

19. The device of claim 1, further comprising a plurality of pedestals.

20. The device of claim 1, further comprising a liquid sample in at least a portion of the interior cavity between the pedestal area of the base plate and the cover plate.

21. A method of making the device of claim 1, comprising:

contacting a first plate with a first negative imprint mold to form the base plate having one or more pedestals and one or more recessed areas;

contacting a second plate with a second negative imprint mold to form the cover plate having one or more spacers; and combining the base and the cover plates into the closed configuration.

22. A method for analyzing a liquid sample for an analyte, comprising:

contacting the device of claim 1 with a liquid sample at or near the exterior sample contact area;

waiting for a period of time for the contacted sample to imbibe into the interior cavity and spread on the pedestal area of the device and equilibrate to form an equilibrated sample; and analyzing the equilibrated sample for a predetermined analyte in the device with an optical analyzer apparatus.

23. The method of claim 22, wherein the step of analyzing the equilibrated sample comprises performing an immunoassay, a nucleic acid assay, a colorimetric assay, a luminescence assay, or any combination thereof.

24. The method of claim 22, wherein the step of analyzing the sample further comprises executing instructions stored on a non-transitory computer-readable medium to determine whether an assay result is trustworthy by analyzing one or more operational variables shown in an image of a portion of the liquid sample.

25. The method of claim 24, wherein the executing instructions comprises an algorithm that is machine learning, artificial intelligence, statistical methods, or a combination thereof.

26. The method of claim 22, wherein the step determination of whether the assay result is trustworthy is performed with a machine-learning model trained with a training set that includes operational variables associated with the analyte in the liquid sample.

27. The method of claim 22, wherein the liquid sample comprises cells, tissues, bodily fluids, stool, or any combination thereof.

28. The method of claim 22, wherein the liquid sample is amniotic fluid, aqueous humour, vitreous humour, blood, breast milk, cerebrospinal fluid (CSF), cerumen (earwax), chyle, chime, endolymph, perilymph, feces, gastric acid, gastric juice, lymph, mucus, pericardial fluid, peritoneal fluid, pleural fluid, pus, rheum, saliva, sebum (skin oil), semen, sputum, sweat, synovial fluid, tears, vomit, urine, or exhaled breath condensate.

29. The method of claim 28, wherein the blood is whole blood, fractionated blood, plasma, or serum.

30. The method of claim 22, wherein the analyte comprises a molecule, a cell, a tissue, a virus, or a nanoparticle.

31. The method of claim 30, wherein the molecule is a protein, peptide, DNA, RNA, or nucleic acid.

32. A system for analyzing a sample, comprising:

the device of claim 1;

a mobile communication device comprising:

one or a plurality of cameras for detecting, imaging, or detecting and imaging, the sample;

electronics, signal processors, hardware and software for receiving, processing, or both, the detected signal, the image of the sample, or both, and for remote communication; and a light source from the mobile communication device or from an external source.

33. The device of claim 1, wherein the base plate is attached to the cover plate at ends of spacers on the base plate, the cover plate, or both.

* * * * *